(12) United States Patent
Lee et al.

(10) Patent No.: US 12,539,648 B2
(45) Date of Patent: Feb. 3, 2026

(54) MOLD SYSTEM, MOLD OPENING APPARATUS, AND METHODS FOR OPENING AND CLOSING A MOLD ASSEMBLY

(71) Applicant: NIKE, Inc., Beaverton, OR (US)

(72) Inventors: Dong Su Lee, ChangWon Si (KR); Sang Hee Lee, Busan (KR); Dae Young Park, Gimhae-si (KR); Ji Hoo Park, Seoul (KR); SungChul Park, Gimhae-Si (KR); Mu Guan Yun, Gimhae-si (KR)

(73) Assignee: NIKE, Inc., Beaverton, OR (US)

( * ) Notice: Subject to any disclaimer, the term of this patent is extended or adjusted under 35 U.S.C. 154(b) by 142 days.

(21) Appl. No.: 18/111,120

(22) Filed: Feb. 17, 2023

(65) Prior Publication Data
US 2023/0256655 A1    Aug. 17, 2023

Related U.S. Application Data

(60) Provisional application No. 63/311,350, filed on Feb. 17, 2022.

(51) Int. Cl.
*B29C 33/28*   (2006.01)
(52) U.S. Cl.
CPC .................................... *B29C 33/28* (2013.01)
(58) Field of Classification Search
CPC ......... B29C 33/28; B29C 33/20; B29C 45/00; B29D 35/0045
See application file for complete search history.

(56) References Cited

U.S. PATENT DOCUMENTS

| | | | | |
|---|---|---|---|---|
| 6,113,382 | A | * | 9/2000 | McNally ................. B29C 33/20 425/453 |
| 2003/0020194 | A1 | * | 1/2003 | Di Dio .................... B29C 45/68 425/149 |
| 2014/0265016 | A1 | * | 9/2014 | Nguyen ............... B29D 35/122 425/408 |
| 2021/0086418 | A1 | * | 3/2021 | Bokich ............... B29C 45/2606 |

FOREIGN PATENT DOCUMENTS

| | | |
|---|---|---|
| CN | 201120679 Y | 9/2008 |
| TW | M275089 U | 9/2005 |

OTHER PUBLICATIONS

International Search Report and Written Opinion received for PCT Patent Application No. PCT/US2023/013323, mailed on Jun. 13, 2023, 10 pages.

\* cited by examiner

*Primary Examiner* — JaMel M Nelson
*Assistant Examiner* — Erica Hartsell Funk
(74) *Attorney, Agent, or Firm* — SHOOK, HARDY & BACON L.L.P.

(57) ABSTRACT

A mold system, mold opening apparatus, and method. The mold opening apparatus can include a mold carrier member, a vertical movement mechanism, a rotational movement mechanism, and one or more mold engagement mechanisms.

15 Claims, 21 Drawing Sheets

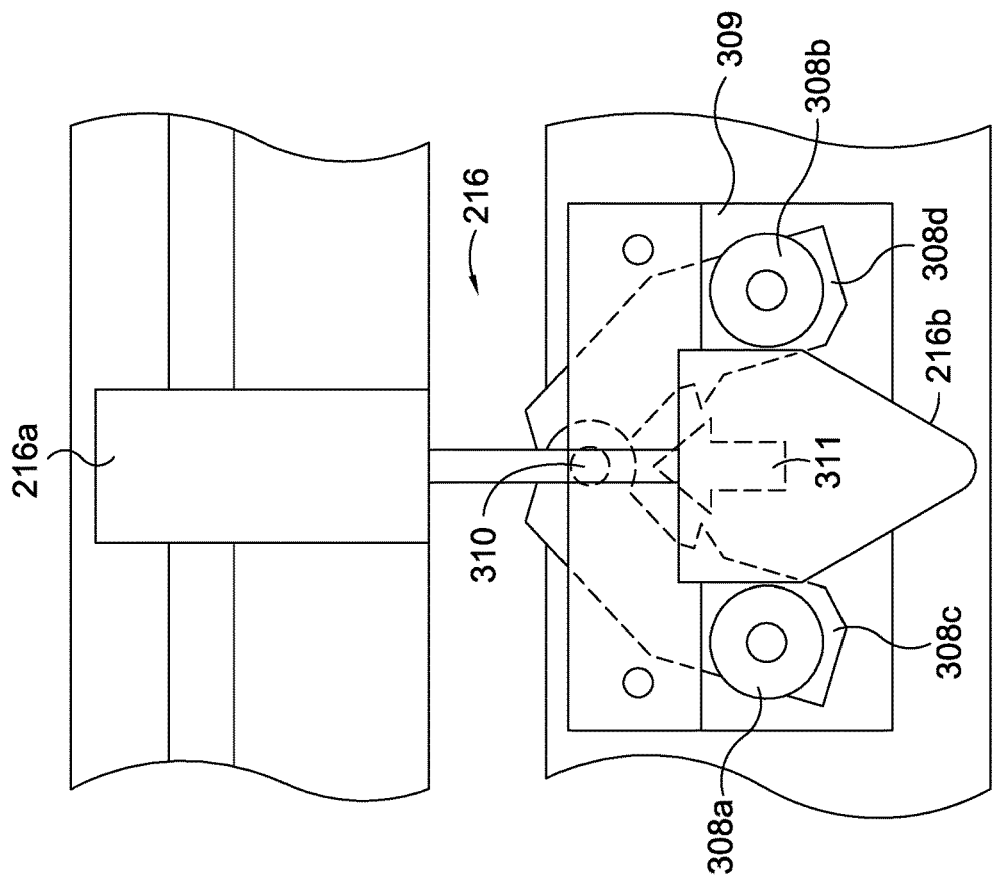
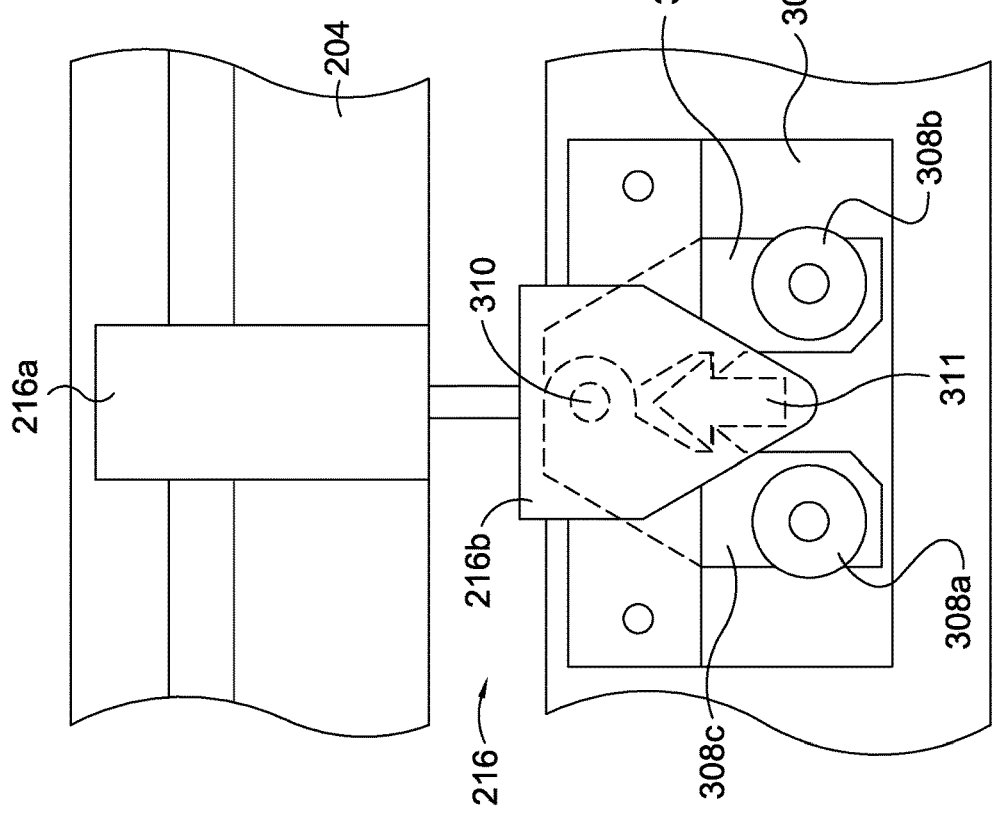
FIG. 3F
FIG. 3E

MOLD SYSTEM, MOLD OPENING APPARATUS, AND METHODS FOR OPENING AND CLOSING A MOLD ASSEMBLY

CROSS-REFERENCE TO RELATED APPLICATIONS

This application, entitled "MOLD SYSTEM, MOLD OPENING APPARATUS, AND METHODS FOR OPENING AND CLOSING A MOLD ASSEMBLY," claims the benefit of priority of U.S. Provisional Application No. 63/311,350, filed Feb. 17, 2022, and entitled "MOLD SYSTEM, MOLD OPENING APPARATUS, AND METHODS FOR OPENING AND CLOSING A MOLD ASSEMBLY," the entirety of which is incorporated by reference herein.

TECHNICAL FIELD

The present disclosure relates to a mold system, mold opening apparatus, and methods for opening and closing a mold assembly. More particularly, the present disclosure relates to a mold system, a mold opening apparatus, and methods for forming at least a part of an article of footwear.

BACKGROUND

Conventional processes for making an article of footwear can include the use of various molds. However, certain systems and processes for using a mold in forming at least a part of an article of footwear can be resource intensive, e.g., due to numerous process steps. Further, due to the resource intensive nature of such processes, there is an increased risk for potential errors in the manufacturing process, resulting in increased waste and/or costs.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects herein relate to mold systems, mold opening apparatuses, and methods for opening and closing a mold assembly for the manufacture of an article, such as a component used in connection with an article of footwear.

Certain systems and processes for forming a portion of an article of footwear, e.g., a midsole or portion thereof, can include inserting a mold material into a mold structure, where the mold structure is a part of one or more mold plates each having a mass of 15 kilograms or more. Certain conventional systems and processes can rely on hinged mold plates for facilitating the opening and closing of a mold. However, given the large mass of each mold plate, such hinges can quickly break down requiring frequent replacement. Further, due to the large mass of the mold plates, a hinge may misalign the mold plates resulting in increased manufacturing errors. In the same or certain other conventional systems, an operator may manually open and close mold plates, with or without various manually operated lifting aids. However, such conventional systems also can result in manufacturing errors due to misalignment of the mold plates, which may be at least partly caused by the large mass of the mold plates.

The mold systems, apparatuses, and methods described herein can alleviate one or more of the problems mentioned above. In certain aspects, the mold systems disclosed herein can provide for properly aligned and positioned movement of mold portions relative to one another to reduce manufacturing errors or other inefficiencies. For example, the mold systems disclosed herein can include a mold opening apparatus, which can include a mold carrier member that can open and close one or more mold portions relative to one another using a vertical movement mechanism and a rotational movement mechanism coupled to the mold carrier member. In certain aspects, the mold opening apparatus first utilizes the vertical movement mechanism to vertically lift in a linear manner a first mold portion up and away from a second mold portion. In such aspects, once the first mold portion is sufficiently spaced apart from the second mold portion, the mold opening apparatus can then rotate the first mold portion about an axis to shift the first mold portion into a vertical position, where a mold material may be inserted into the second mold portion. In aspects, the specific ordered movements of the mold opening apparatus can reduce manufacturing errors and other inefficiencies. For example, initially vertically lifting in a linear motion one mold portion away from another mold portion results in substantially less risk that the movement of the first mold portion alters the position of the second mold portion or a mold material therein, as compared to initially performing a complex movement to move a mold, such as rotating the first mold portion relative to the second mold portion.

BRIEF DESCRIPTION OF THE DRAWINGS

Illustrative aspects are described in detail below with reference to the attached drawing figures, which are incorporated by reference herein and wherein:

FIG. 3E is a front view of a portion of the mold lock engagement mechanism and a mold lock, with the mold lock in a locked configuration; in accordance with aspects hereof;

FIG. 3F is a front view of a portion of the mold lock engagement mechanism and a mold lock, with the mold lock in an unlocked configuration; in accordance with aspects hereof;

DESCRIPTION

Figure 1:
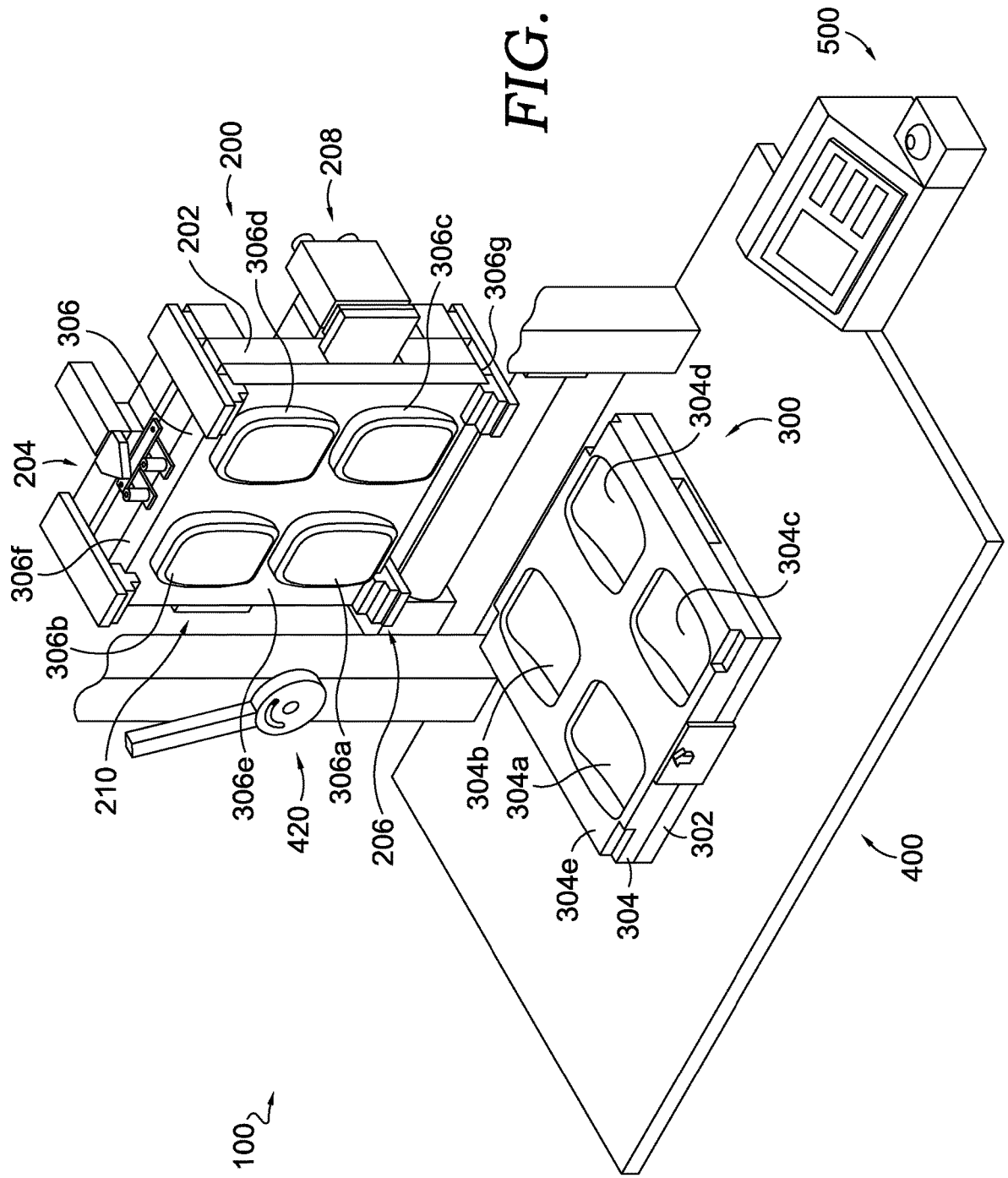
FIG. 1 depicts a front and side perspective view of a mold system, particularly showing a mold opening apparatus, a mold assembly in a first mold and second mold open configuration, a support structure, and a control unit, in accordance with aspects hereof.

Aspects herein relate to mold systems, mold opening apparatuses, and methods for opening and closing a mold assembly. In certain aspects, the systems and methods disclosed herein can be used to form at least a portion of an article of footwear.

Certain systems and processes for forming a portion of an article of footwear, e.g., a midsole or portion thereof, can include inserting a mold material into a mold structure, where the mold structure is a part of one or more mold plates each having a mass of 15 kilograms or more. Certain conventional systems and processes can rely on hinged mold plates for facilitating the opening and closing of a mold. However, given the large mass of each mold plate, such hinges can quickly break down requiring frequent replacement. Further, due to the large mass of the mold plates a hinge may misalign the mold plates resulting in increased manufacturing errors. In the same or certain other conventional systems, an operator may manually open and close mold plates, with or without various manually operated lifting aids. However, such conventional systems also can result in manufacturing errors due to misalignment of the mold plates, which may be at least partly caused by the large mass of the mold plates.

The mold systems, apparatuses, and methods described herein can alleviate one or more of the problems mentioned above. In certain aspects, the mold systems disclosed herein can provide for properly aligned and positioned movement of mold portions relative to one another to reduce manufacturing errors or other inefficiencies. For example, the mold systems disclosed herein can include a mold opening apparatus, which can include a mold carrier member that can open and close one or more mold portions relative to one another using a vertical movement mechanism and a rotational movement mechanism coupled to the mold carrier member. In certain aspects, the mold opening apparatus first utilizes the vertical movement mechanism to vertically lift in a linear manner a first mold portion up and away from a second mold portion. In such aspects, once the first mold portion is sufficiently spaced apart from the second mold portion, the mold opening apparatus can then rotate the first mold portion about an axis to shift the first mold portion into a vertical position, where a mold material may be inserted into the second mold portion. In aspects, the specific ordered movements of the mold opening apparatus can reduce manufacturing errors and other inefficiencies. For example, initially vertically lifting in a linear manner one mold portion away from another mold portion results in substantially less risk that the movement of the first mold portion alters the position of the second mold portion or a mold material therein, as compared to initially performing a complex movement to move a mold, such as rotating the first mold portion relative to the second mold portion.

In certain aspects, the mold carrier member may be coupled to one or more mold engagement mechanisms that can removably secure one or more molds prior to shifting the molds. In certain aspects, the one or more mold engagement mechanisms can removably secure to multiple sides of a mold prior to vertically and/or rotationally shifting a mold, which can aid in maintaining proper alignment of the mold portions.

In various aspects, initially vertically shifting a first mold portion to provide space between the first mold portion and a second mold portion, prior to rotating the first mold portion about an axis, may aid in reducing manufacturing errors with certain mold structures and/or mold surfaces. For instance, in one aspect, the mold assemblies disclosed herein can include a first mold portion having one or more convex mold surfaces, while a second mold portion that faces the first mold portion may include one or more concave mold surfaces. Vertically shifting the first mold portion up and away from the second mold portion can aid in release of the convex surface of the first mold portion from the concave complementary surface of the second mold portion in such a manner so as to not deform a mold material or mold surface (as opposed to attempting to initially rotate the first mold portion away from the second mold portion, as the initial rotation may cause a deformity in the mold material and/or mold surface).

Accordingly in one aspect, a mold opening apparatus is provided. The mold opening apparatus can include a mold carrier member, where the mold carrier member includes a first side, a second side opposite the first side; a front side, and a back side opposite the front side. The mold opening apparatus can also include a vertical movement mechanism coupled to the mold carrier member; and a rotational movement mechanism coupled to the mold carrier member. The mold opening apparatus can also include one or more mold engagement mechanisms, where the one or more mold engagement mechanisms are coupled to at least a portion of the mold carrier member.

In another aspect, a method for opening and closing a mold assembly is provided. The method can include contacting a first mold portion of a mold assembly with one or more mold engagement mechanisms, where the mold assembly includes at least the first mold portion and a second mold portion. The method can also include vertically shifting the first mold portion away from the second mold portion, where the second mold portion is positioned between the first mold portion and a support structure. The method can also include, subsequent to the vertically shifting the first mold portion away from the second mold portion, rotating the first mold portion about an axis to a first mold portion and second mold portion open configuration. In the first mold portion and second mold portion open configuration, a plane extending between a first side and second side of the first mold portion, and between a front end and back end of the first mold portion is at an angle of 70° or more relative to a plane extending between a first side and second side of the second mold portion, and between a front end and back end of the second mold portion.

In yet another aspect, a mold system is provided. The mold system can include a mold assembly that includes a first mold portion and a second mold portion. The mold system can also include a mold opening apparatus. The mold opening apparatus can include a mold carrier member, where the mold carrier member includes a first side, a second side opposite the first side; a front side, and a back side opposite the front side. The mold opening apparatus can also include a vertical movement mechanism coupled to the mold carrier member; and a rotational movement mechanism coupled to the mold carrier member. The mold opening apparatus can also include one or more mold engagement mechanisms, where the one or mold engagement mechanisms are coupled to at least a portion of the mold carrier member.

As discussed above, aspects herein are directed to a mold system, a mold opening apparatus, and methods of opening and closing a mold assembly. The mold system, apparatus, and methods disclosed herein can be utilized to form a portion of an article of footwear, in aspects.

An article of footwear, e.g., shoe, cleat, sandal, slipper, and boot, and the like, can include one or more components. In an example, an article of footwear can include a footwear upper and a bottom unit. A footwear upper, or referred to as an upper for short, is a foot-securing component of the footwear. The upper extends from the bottom unit and secures the bottom unit to a foot of a wearer. The upper may be formed from a variety of materials, such as leather, knit, woven, braided, felted, non-woven, and the like. An upper may be made from a single material or a variety of materials. The bottom unit can include an outsole, a midsole, an inner sole or a combination thereof. In a non-limiting example, the mold systems, apparatuses, and methods disclosed herein can be utilize to form a portion of a bottom unit, such as, for example, a midsole. Molding materials are discussed further below.

FIG. 1 depicts one example of a mold system, mold system 100. In the aspect depicted in FIG. 1, the mold system 100 can include a mold opening apparatus 200, a mold assembly 300, a support structure 400, and a control unit 500. It should be understood that each of the components of the mold system 100 depicted in FIG. 1 are just example components, and modifications to these components and different arrangements of the components are also contemplated by the disclosure herein. Further, it should be understood that one or more of the components of the mold system 100 depicted in FIG. 1 may include additional features that have been removed from FIG. 1 for clarity. Various additional features and aspects, are discussed below.

In aspects, as discussed above, the mold opening apparatus and methods disclosed herein can facilitate the opening and closing of a mold assembly. In various aspects, the mold assembly can include at least two mold portions. In the same or alternative aspects, the mold assembly can include three or more mold portions. As can be seen in the aspect depicted in FIG. 1, the mold assembly 300 includes three mold portions: a base mold portion 302, a middle mold portion 304, and a top mold portion 306. In the aspect depicted in FIG. 1, the top mold portion 306, middle mold portion 304, and base mold portion 302 are individual, separate portions of the mold assembly 300. For instance, in an aspect, each of the top mold portion 306, middle mold portion 304, and base mold portion 302 can be individual plates having one or more mold surfaces thereon.

In certain aspects, each of the top mold portion 306, middle mold portion 304, and base mold portion 302 can have a mass that is about 10 kilograms (kg) or more, about 15 kg or more, or about 20 kg or more.

In an aspect, the top mold portion 306, middle mold portion 304, and base mold portion 302 can each have one or more mold surfaces such that the mold assembly 300 can mold one or more components. For instance, as depicted in FIG. 1, the middle mold portion 304 includes at least four mold surfaces 304a, 304b, 304c, and 304d on an upper side 304e, and the top mold portion 306 includes at least four mold surfaces 306a, 306b, 306c, and 306d on a bottom side 306e. As will be discussed further below, the mold surfaces 306a, 306b, 306c, and 306d exhibit a convex shape, while the mold surfaces 304a, 304b, 304c, and 304d exhibit a complementary concave shape. Additional aspects of the mold assembly, the molds, and mold surfaces will be discussed further below.

In one aspect, the mold assembly 300 does not include one or more hinges connecting two or more of the top mold portion 306, middle mold portion 304, and base mold portion 302 together and that is used to move one or more of the molds relative to the remainder of the molds. Rather, in aspects, as discussed herein, the mold opening apparatus 200 can move one or more of the molds relative to the remainder of the molds. In the aspect depicted in FIG. 1, the mold assembly 300 includes the top mold portion 306 vertically oriented with respect to the middle mold portion 304 and base mold portion 302 in a top mold portion 306 and middle mold portion 304 open configuration. In aspects, the mold opening apparatus 200 can move one or more of the top mold portion 306 and middle mold portion 304 with respect to the base mold portion 302. The specific mold movement functions of the mold opening apparatus 200 are discussed in detail below.

In the aspect depicted in FIG. 1, the mold opening apparatus 200 can include a mold carrier member 202, a mold front end engagement mechanism 204, a mold back end engagement mechanism 206, and mold side engagement mechanisms 208 and 210. In aspects, one or more of the mold engagement mechanisms can removably secure to one or more of the top mold portion 306 or the middle mold portion 304 for lifting and/or rotating the top mold portion 306 and/or middle mold portion 304 away from the base mold portion 302. For instance, as can be seen in the aspect depicted in FIG. 1, the mold front end engagement mechanism 204 is removably secured to a front end 306f of the top mold portion 306 and the mold back end engagement mechanism 206 is removably secured to the back end 306g of the top mold portion 306. The mold engagement mechanisms 204, 206, 208, and 210 and associated functionality are discussed in detail further below. Further, additional components, such as a vertical movement mechanism and a rotational movement mechanism, of the mold opening apparatus 200 will be discuss in detail further below with reference to FIGS. 2E-2G.

In the aspect depicted in FIG. 1, the mold system 100 can also include a control unit 500. In aspects, the control unit 500 can be communicably coupled to one or more components of the mold opening apparatus 200 for controlling the movement of one or more of the mold engagement mechanisms 204, 206, 208, and 210, the vertical movement mechanism, or the rotational movement mechanism. In certain aspects, the control unit 500 can include control instructions stored in computer memory that are utilized by a processor to control the movement of one or more mold engagement mechanisms, the vertical movement mechanism, or the rotational movement mechanism.

In FIGS. 2A-6B an example process is detailed in a step-wise manner to illustrate the various movements and functions of the components of the mold system 100. Starting with FIG. 2A, the mold assembly 300 is positioned on the support structure 400. The mold assembly 300 can be moved into position on the support structure 400 using any convenient movement mechanism. In aspects, the mold assembly 300 can engage one or more positioning members to aid in positioning and/or securing the mold assembly 300, as best seen in FIG. 2B. For clarity, FIG. 2B depicts the base mold portion 302 of the mold assembly 300 (as opposed to the base mold portion 302, middle mold portion 304, and top mold portion 306) positioned on the support structure 400, with positioning members 402, 404, and 406 engaging at least a portion of the base mold portion 302. In certain aspects, one or more of the positioning members 402, 404, and 406 may be removably or fixedly secured to the support structure 400. In the aspect depicted in FIG. 2B, the positioning member 402 can include a fixed portion 402a and a moveable portion 402b, where the mold assembly 300 or portion thereof, can contact the fixed portion 402a and then once in place, the moveable portion 402b can rotate about an axis 402c to secure multiple sides of the mold assembly or portion thereof in place. The positioning member 404 can also function similarly to that of the positioning member 402, in aspects. In the aspect depicted in FIG. 2B, the positioning member 406 can include a mold positioning member 406b that can shift towards the base mold portion 302 and/or mold assembly to secure the base mold portion 302 and/or mold assembly in position. In aspects, the mold positioning member 406b can be shiftable via an actuator 406a. The actuator 406a can be any type of actuator suitable for use in the present disclosure, including, but not limited to, a pneumatic actuator. In aspects, the actuator 406a and/or the positioning member 406 can be communicatively coupled to a control unit, e.g., the control unit 500 of FIG. 1. It should be understood that the positioning members 402, 404, and 406 depicted in FIG. 2B are just one example of positioning members and that other types or designs, or number, of positioning members is contemplated by the present disclosure. In aspects, the alignment of the mold assembly 300 on the support structure 400 can ensure the proper movement of the mold opening apparatus 200.

Figure 2A:
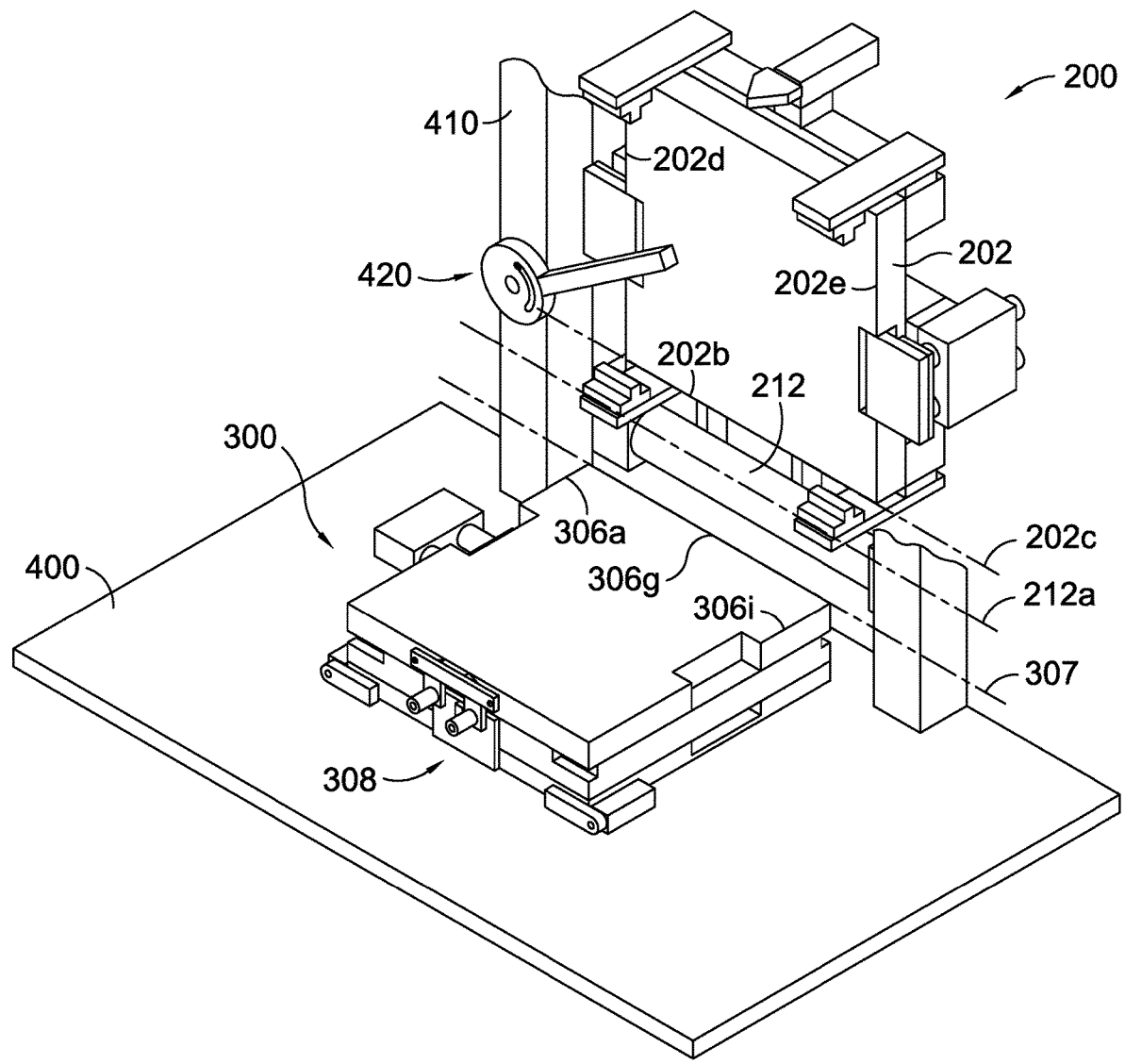
FIG. 2A depicts a front and side perspective view of portions of a mold system, particularly showing a mold carrier member in a vertical orientation with respect to a mold assembly, in accordance with aspects hereof.
Figure 2B:
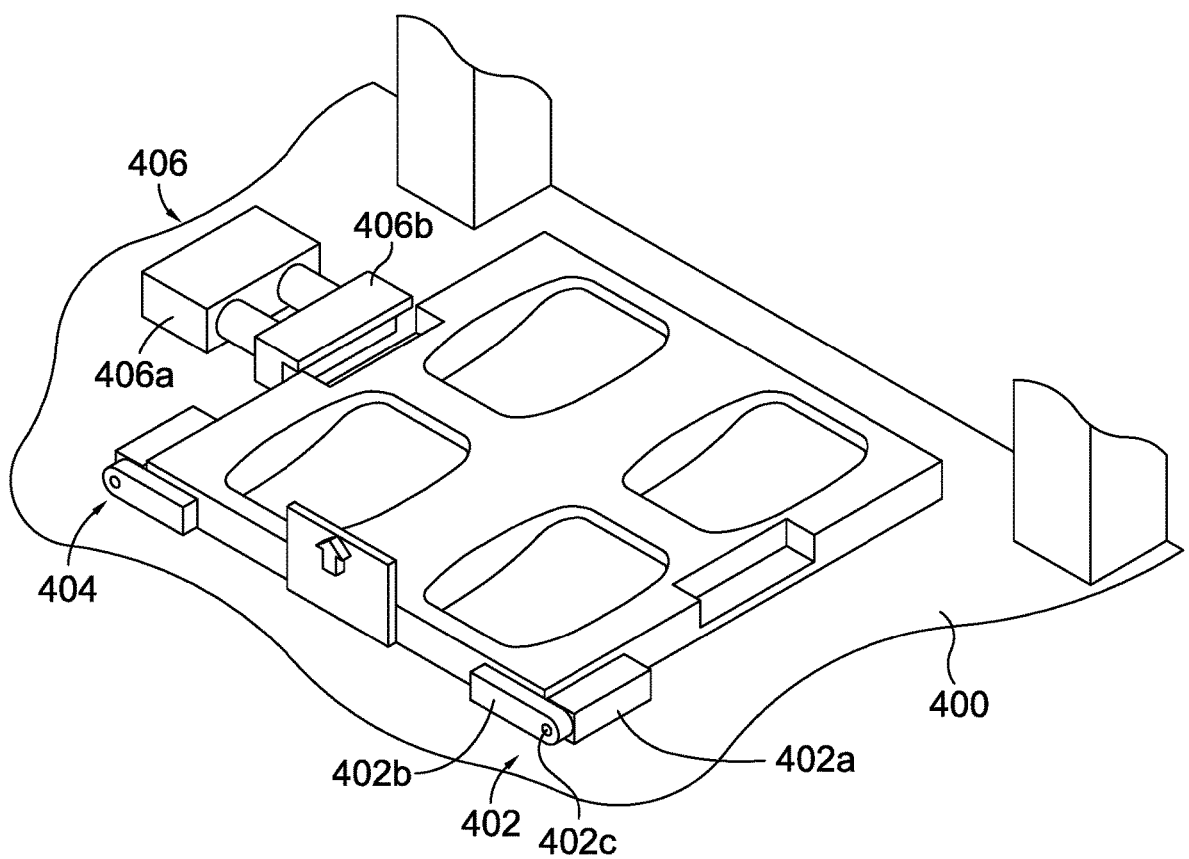
FIG. 2B depicts a front and side perspective view of portions of the mold system of FIG. 2A, particularly showing a portion of a support structure, with a base mold positioned thereon, and mold assembly positioning members contacting the base mold, in accordance with aspects hereof.

In the aspect depicted in FIG. 2A, the mold assembly 300 comprises a mold lock 308. In aspects, the mold lock 308 can be adapted to secure the individual molds of the mold assembly 300 to one another. For instance, when positioning the mold assembly 300 on the support structure 400 and/or removing the mold assembly 300 from the support structure 400, the mold lock 308 can maintain alignment of the molds and/or removably connect the molds for transport. The mold lock 308 is discussed in detail further below.

As can be seen in FIG. 2A, the mold carrier member 202 is vertically oriented relative to the mold assembly 300. In such aspects, having the mold carrier member 202 vertically positioned can provide space for the positioning of the mold assembly 300 on the support structure 400. As depicted in FIG. 2A, a support member 410 extends up from the support structure 400 and can include a securing member 420. In various aspects, the securing member 420 can be shifted, such as that shown in the aspect of FIG. 2A, to block inadvertent downward rotational movement of the mold carrier member 202 and/or one or more molds coupled to the mold carrier member 202. In aspects, when it is desirable or intended to have the mold carrier member 202 and/or one or more molds coupled to the mold carrier member 202 shift and/or rotate from a vertical position, e.g., to a horizontal position of the mold assembly depicted in FIG. 2A, the securing member 420 can be shifted away, e.g., to a position depicted in FIG. 1.

As discussed above, in certain aspects, the mold opening apparatus can facilitate the opening and closing of the molds in the mold assembly to allow for insertion of one or more mold materials. Once the mold assembly 300 is positioned on the support structure 400, the mold carrier member 202 can rotate about an axis 212a towards the mold assembly. In the aspect depicted in FIG. 2A, the axis 212a is parallel or substantially parallel with a direction of extension 307 of the back end 306g of the top mold portion 306 between the side 306h and the side 306i. In the same or alternative aspects, the axis 212a is parallel or substantially parallel with a direction of extension 202c of the back end 202b of the mold carrier member 202 between the side 202d and and the side 202e. In aspects, the mold carrier member 202 can rotate about the axis 212a from the vertical position depicted in FIG. 2A to the horizontal position depicted in FIG. 2C.

Figure 2C:
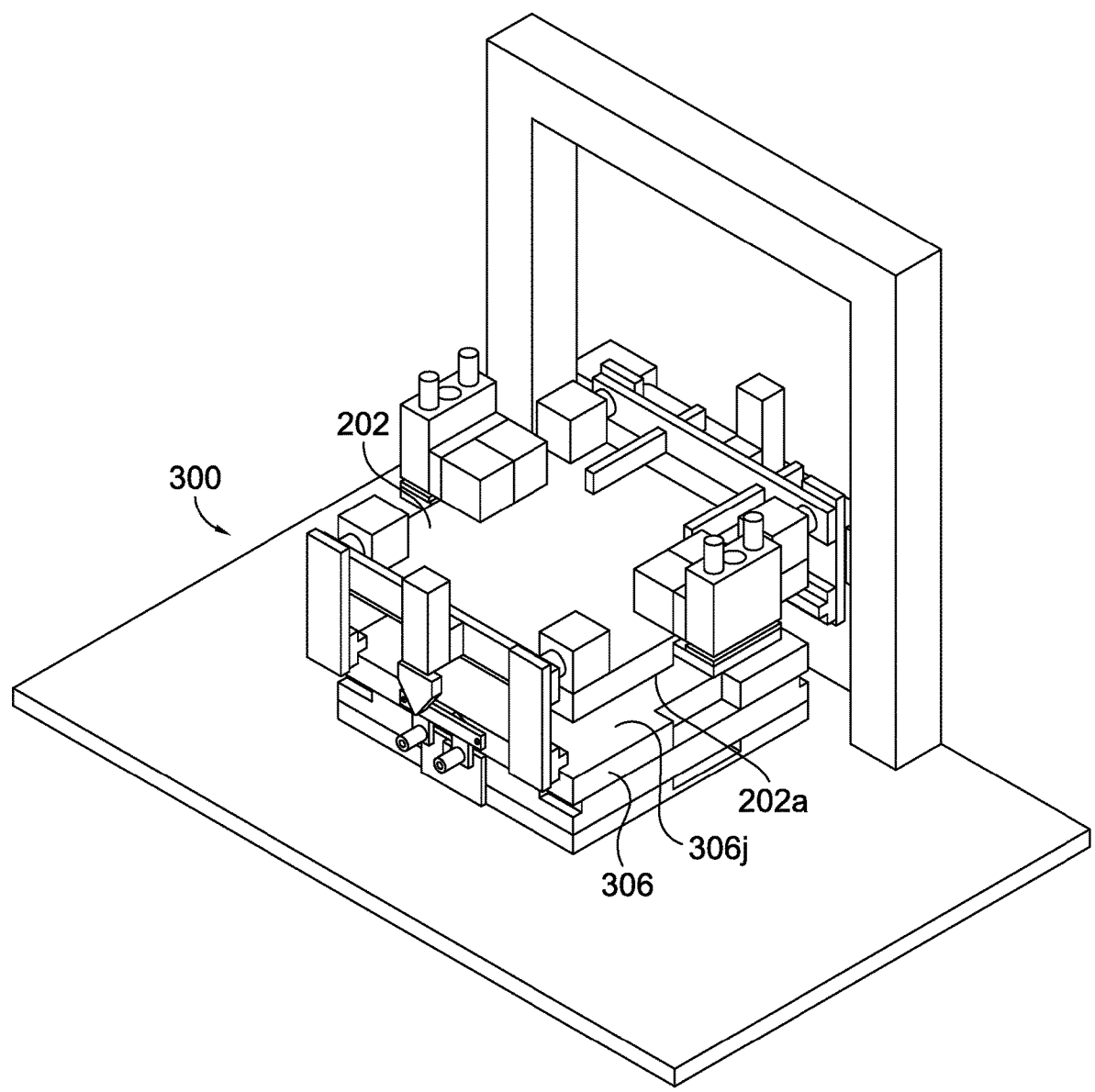
FIG. 2C depicts a front and side perspective view of the mold system of FIG. 2A, particularly showing the mold carrier member rotated about an axis from the vertical position to a horizontal position above the mold assembly, in accordance with aspects hereof.
Figure 2D:
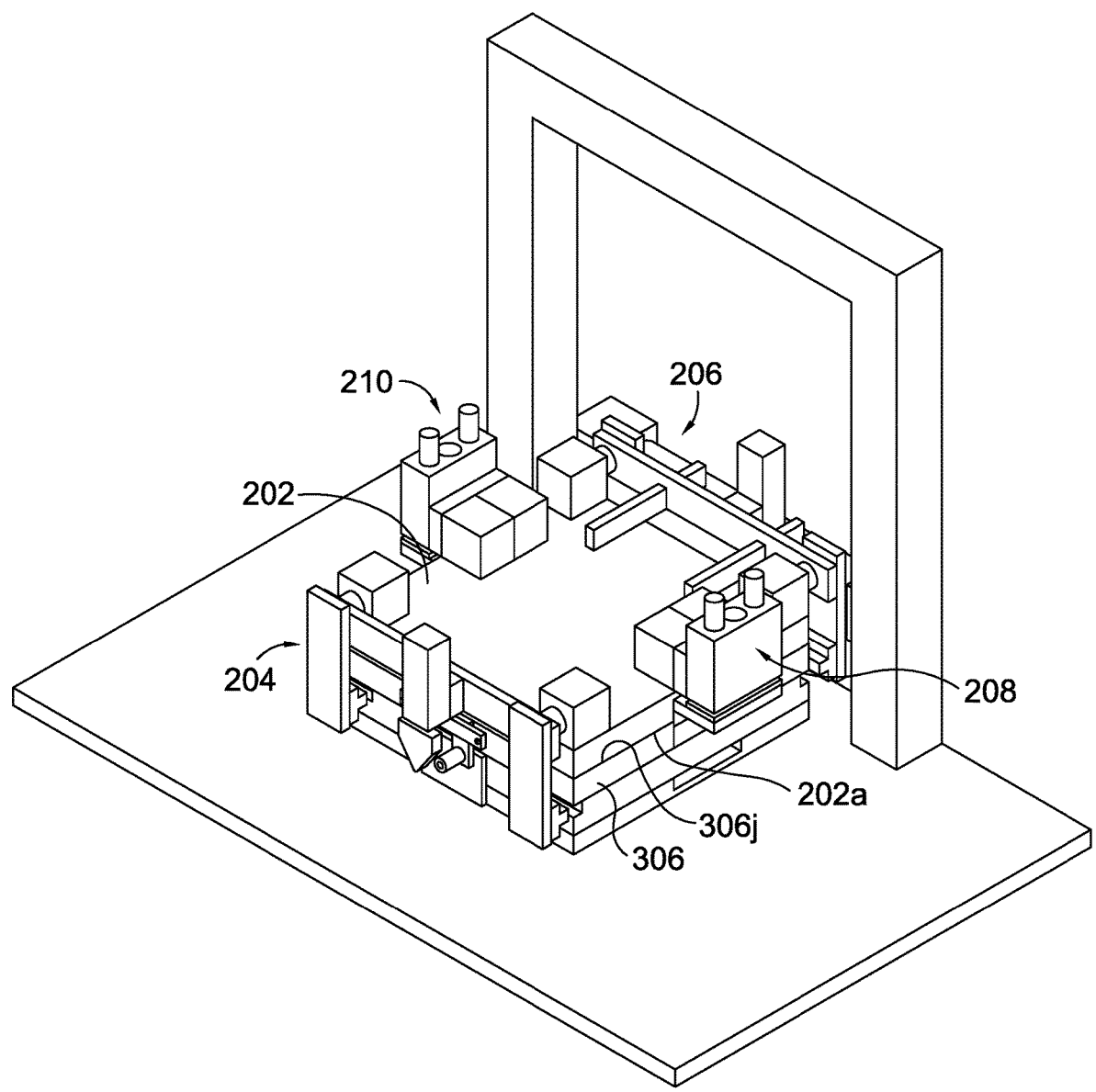
FIG. 2D depicts a front and side perspective view of the mold system of FIG. 2C, particularly showing the mold carrier member vertically shifted downward towards the mold assembly, in accordance with aspects hereof.
Figure 2E:
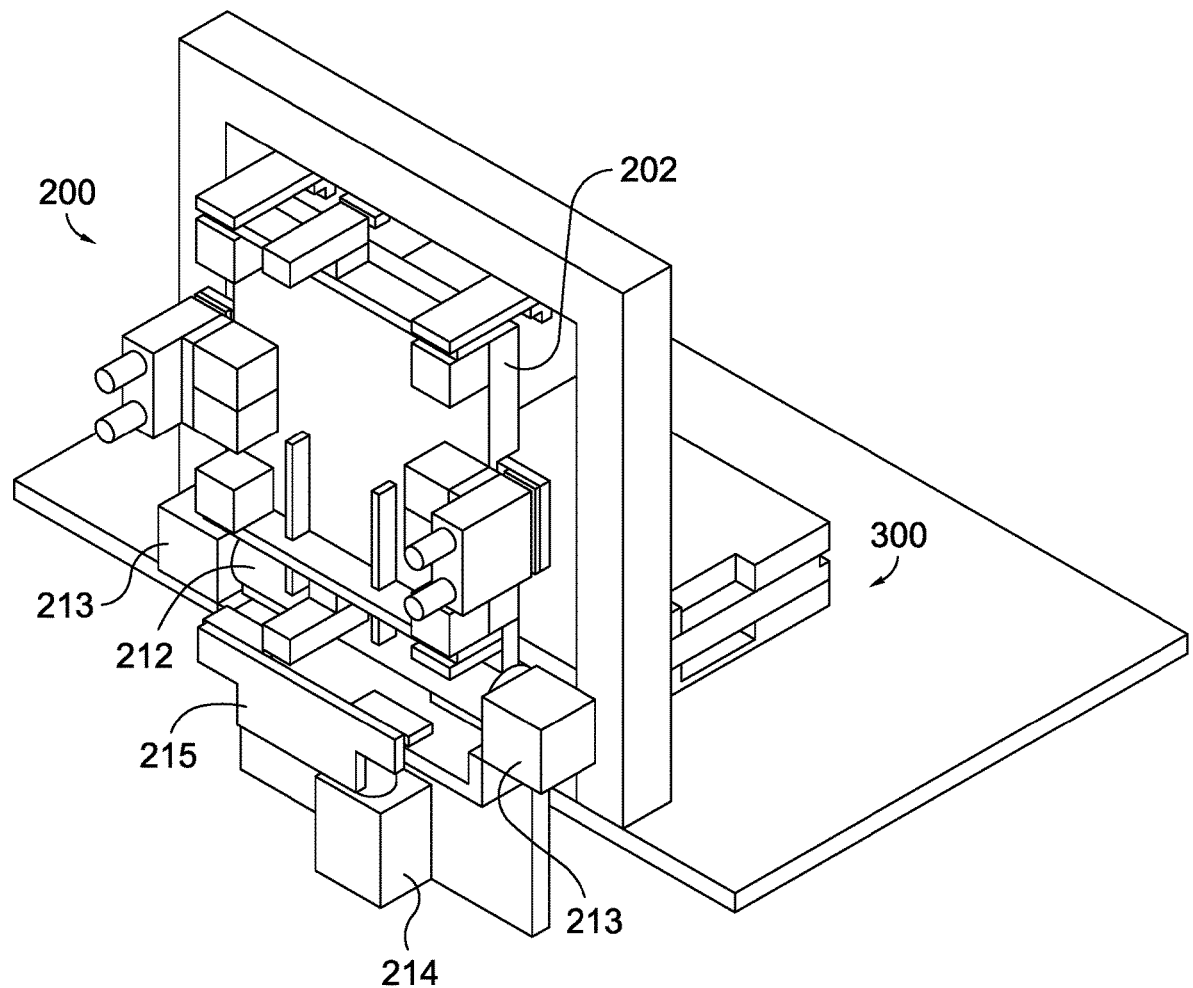
FIG. 2E depicts a back and side perspective view of the mold system of FIG. 2A, particularly showing a vertical movement mechanism, a rotational movement mechanism, and a rotational locking member in an unlocked configuration, in accordance with aspects hereof.

As best seen in FIG. 2E, the mold opening apparatus 200 can utilize a rotational movement mechanism 213 to rotate the mold carrier member 202 about the axis 212a towards and away from the mold assembly 300 or portion thereof. In the aspect depicted in FIG. 2E, the mold carrier member 202 can be coupled to a rotational member 212, which can be rotated by the rotational movement mechanism 213. In various aspects, the rotational movement mechanism 213 can be any type of movement mechanism suitable for use in the systems disclosed herein. In one non-limiting example, the rotational movement mechanism 213 can include a pneumatic rotary actuator. In aspects, the mold opening apparatus 200 can also include a rotational locking member 215 for inhibiting rotational movement of the mold carrier member 202, e.g., when the mold carrier member 202 is vertically shifting or about to vertically shift. As discussed further below, the mold carrier member 202 can vertically shift using a vertical movement mechanism, such as the example vertical movement mechanism 214 depicted in FIG. 2E. In the aspect depicted in FIG. 2E, the rotational locking member 215 is shifted out and away from the rotational member 212 into a disengaged configuration to allow rotational movement of the rotational member 212 and mold carrier member 202. The engaged and/or locked configuration of the rotational locking member 215 will be discussed further below with respect to FIGS. 2F and 2G.

As can be seen in FIG. 2C, the mold carrier member 202 has rotated, from the position depicted in FIG. 2A, down towards the mold assembly 300. In the aspect depicted in FIG. 2C, the mold carrier member 202 is positioned above the mold assembly 300 and/or the top mold portion 306. In aspects, the distance between the bottom surface 202a of the mold carrier member 202 and the top side 306j of the top mold portion 306 can be about 150 centimeters (cm) or less, about 125 cm or less; or of from about 10 cm to about 150 cm, or of from about 10 cm to about 125 cm.

Figure 2F:
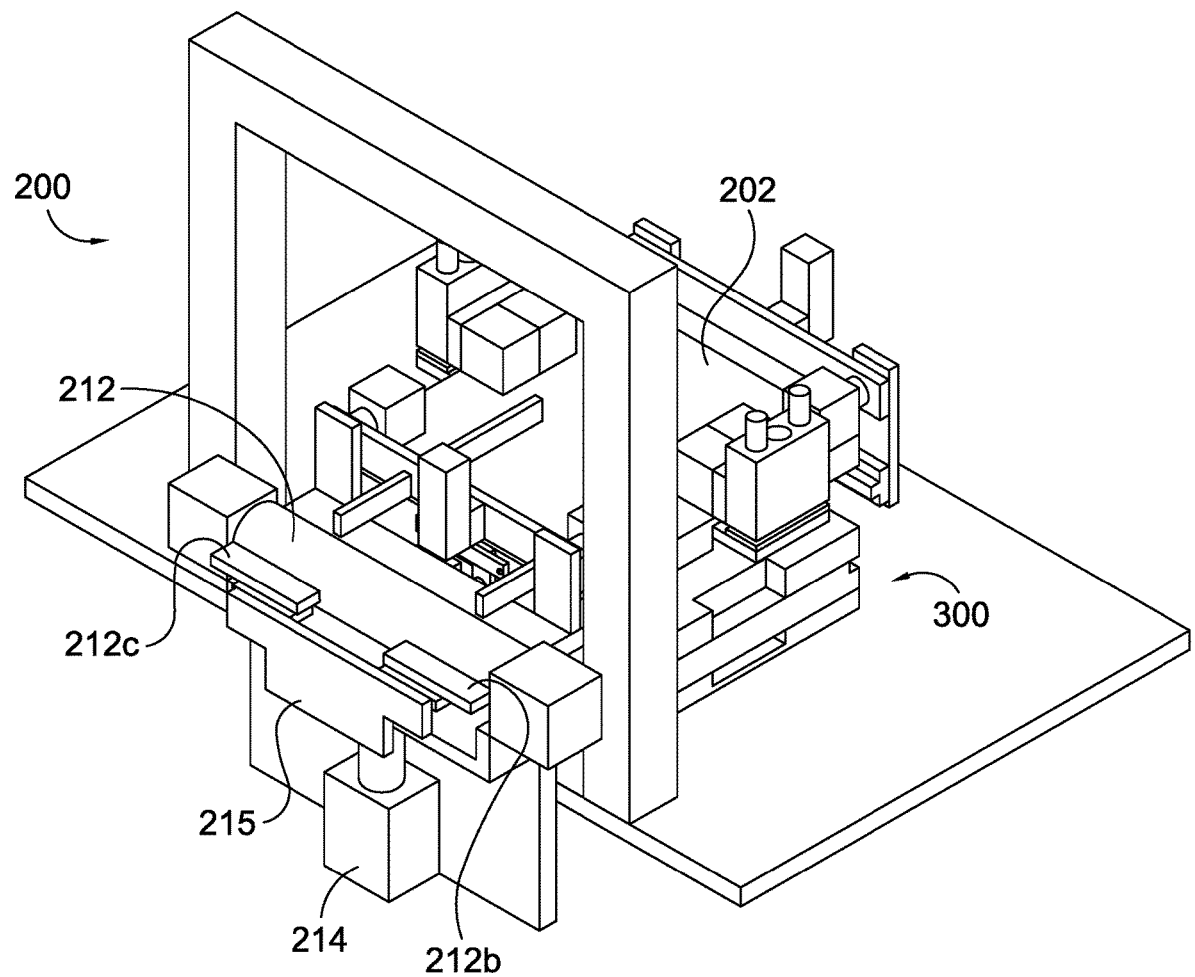
FIG. 2F depicts a back and side perspective view of the mold system of FIG. 2C, particularly showing the rotational locking member in a locked configuration, in accordance with aspects hereof.

FIG. 2F depicts a back view of the mold opening apparatus 200 in the position depicted in FIG. 2C. In aspects, since, in FIGS. 2C and 2F, the mold carrier member 202 has already rotated down towards the mold assembly 300, the mold carrier member 202 is positioned and/or ready to vertically shift down to the mold assembly 300. In such aspects, the rotational locking member 215 has shifted from the disengaged configuration of FIG. 2E to the engaged configuration depicted in FIG. 2F, e.g., so that vertical movement of the mold carrier member 202 by the vertical movement mechanism 214 can commence. As best seen in the aspect depicted in FIG. 2F, the rotational locking member 215 has shifted towards the rotational member 212, and at least a portion of the rotational locking member 215 is positioned underneath the tabs 212c and 212b on the rotational member 212. In such an aspect in the engaged configuration, the rotational member 212 and the mold carrier member 202 is prevented from rotating, e.g., to shift the mold carrier member 202 into the vertical position.

Figure 2G:
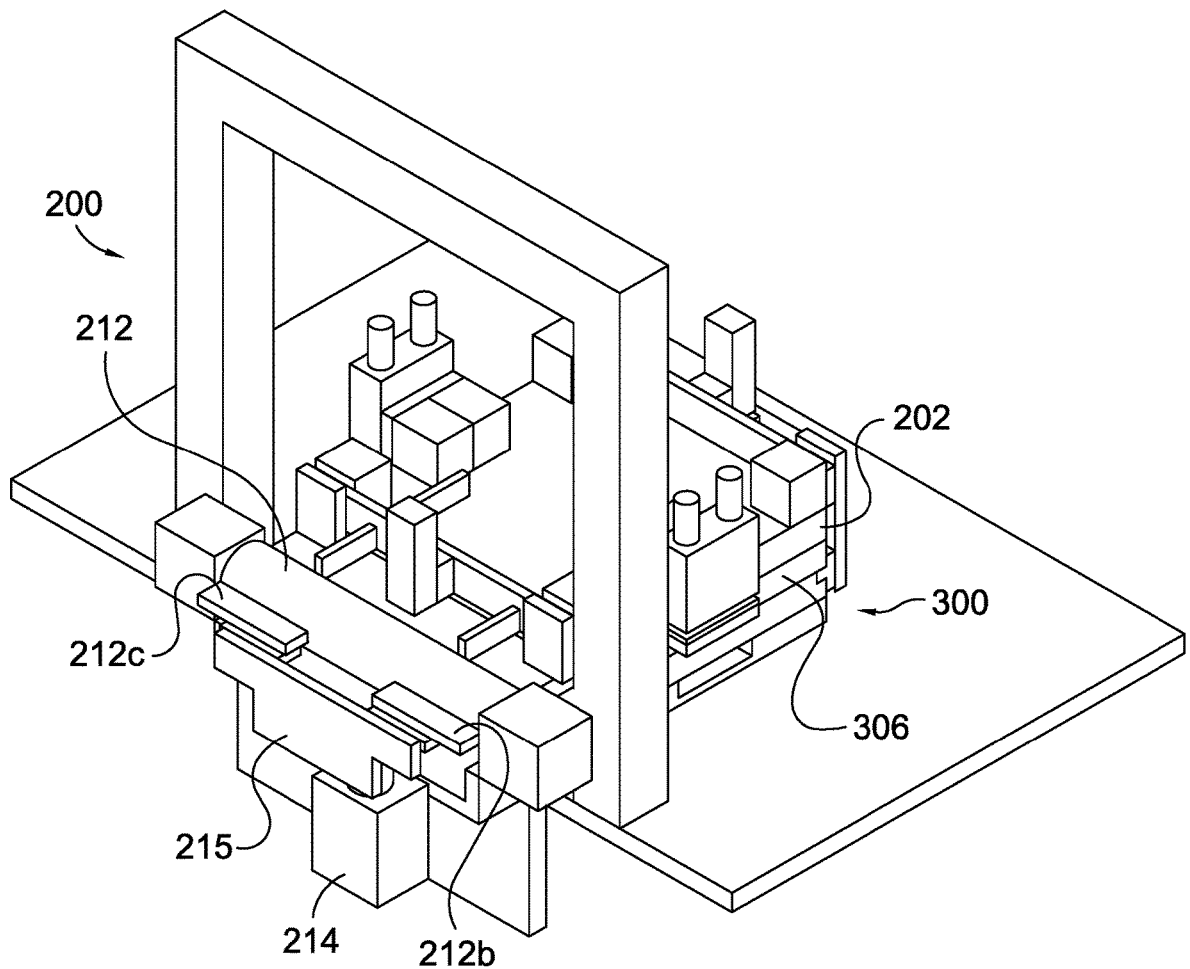
FIG. 2G depicts a back and side perspective view of the mold system of FIG. 2D, particularly showing the rotational locking member in a locked configuration, and further showing a mold front end engagement mechanism contacting a top mold, in accordance with aspects hereof.

In the aspect depicted in FIGS. 2D and 2G, the mold carrier member 202 has vertically shifted downward toward the top mold portion 306, e.g., via the vertical movement mechanism 214. In certain aspects, the bottom surface 202a of the mold carrier member 202 can contact the top side 306j of the top mold portion 306, once the mold carrier member 202 has vertically shifted downward, as best seen in FIG. 2D. In the aspect depicted in FIG. 2G, the mold carrier member 202 has vertically shifted downward, along with the rotational member 212, and rotational locking member 215. In the aspect depicted in FIG. 2G, the rotational locking member 215 remains in an engaged or locked configuration, e.g., a portion of the rotational locking member 215 is positioned underneath and/or contacting the tabs 212b and 212c of the rotational member 212.

In operation, once the mold carrier member 202 has rotated towards the mold assembly and vertically shifted down onto, or adjacent to, the mold assembly, one or more mold engagement mechanisms can be utilized to removably secure to one or molds, e.g., in order to move one or more molds as discussed herein. In one aspect, the one or more mold engagement mechanisms can include one or more mold engagement mechanisms depicted in FIG. 2D: the mold side engagement mechanisms 208 and/or 210; the mold front end engagement mechanism 204; and the mold back end engagement mechanism 206. FIGS. 3A-3F depict various aspects and functions of the mold front end engagement mechanism 204 and mold back end engagement mechanism 206, while the later figures depict various aspects and functions of the mold side engagement mechanisms 208 and/or 210.

Figure 3A:
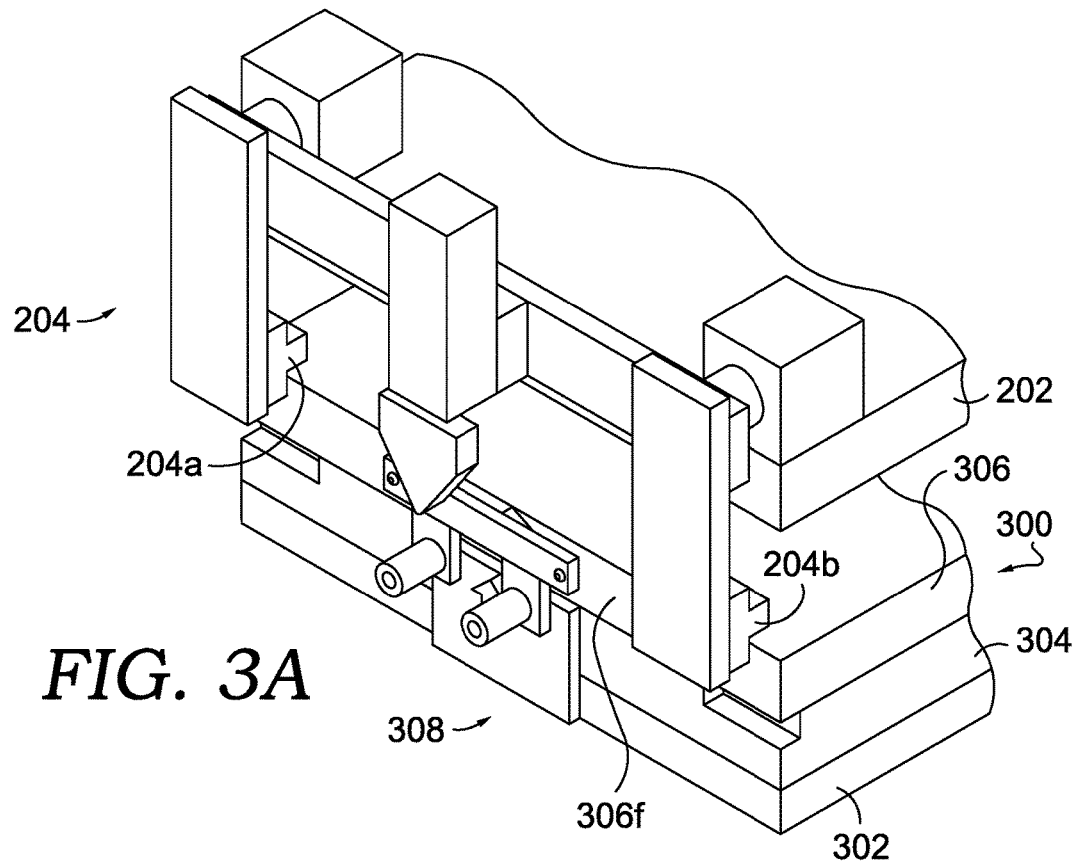
FIG. 3A depicts a front and side perspective view of a portion of a mold carrier member and a mold front end engagement mechanism coupled thereto, where the mold carrier assembly is positioned above a top mold of a mold assembly, and a mold lock is in a locked configuration, in accordance with aspects hereof.

As can be seen in FIG. 3A, the mold carrier member 202 is positioned above the mold assembly 300 and/or top mold portion 306, similar to the position of the mold carrier member 202 depicted in FIG. 2C. In the aspect depicted in FIG. 3A, the mold front end engagement mechanism 204 is positioned such that, upon downward movement of the mold carrier member 202, the engagement structures 204a and 204b will not contact the front end 306f of the top mold portion 306 or other portions of the mold assembly 300. Further, in the aspect depicted in FIG. 3A, a mold lock 308 is in a locked configuration, which in aspects, can prevent vertical and/or other movement of one of the top mold portion 306, the middle mold portion 304 and/or the base mold portion 302, with respect to the other.

Figure 3B:
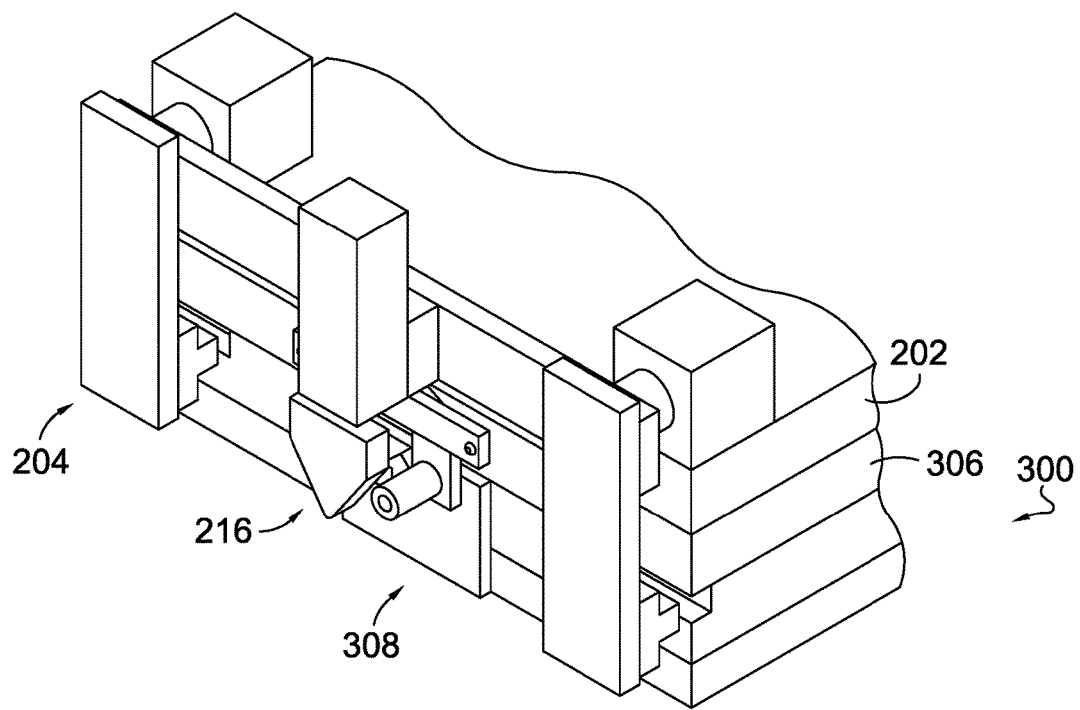
FIG. 3B depicts a front and side perspective view of a portion of a mold carrier member and a mold front end engagement mechanism coupled thereto, with the mold carrier member vertically shifted towards the top mold and the mold assembly, with the mold lock in a locked configuration, in accordance with aspects hereof.

In FIG. 3B, the mold carrier member 202 has vertically shifted down onto or adjacent to the top mold portion 306, similar to the position of the mold carrier member 202 depicted in FIG. 2D. Like in the aspect depicted in FIG. 3A, the mold front end engagement mechanism 204 is positioned outward, away from the mold assembly 300. In such an aspect, the mold lock engagement mechanism 216 is also positioned outward with respect to the mold assembly 300 and mold lock 308.

Figure 3C:
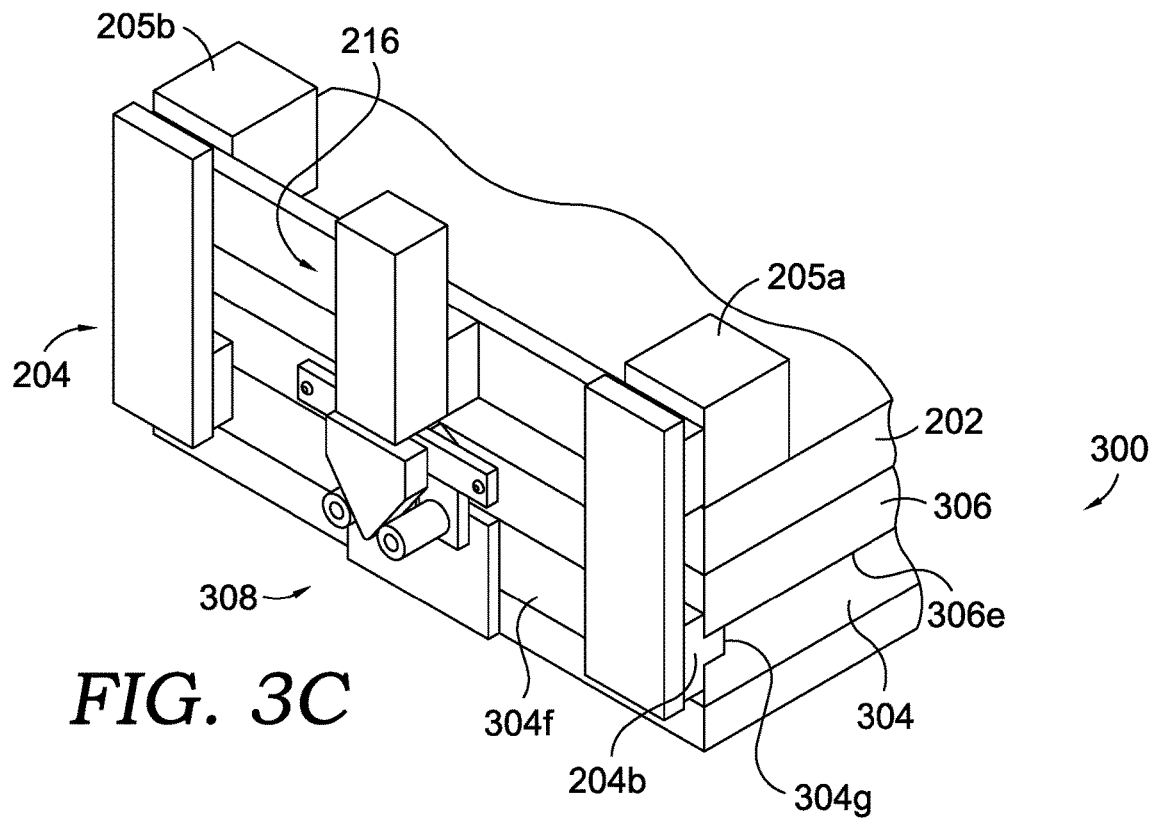
FIG. 3C depicts a front and side perspective view of a portion of a mold carrier member and a mold front end engagement mechanism coupled thereto, with the mold front end engagement mechanism horizontally shifted to engage at least a portion of the top mold, with the mold lock in a locked configuration, in accordance with aspects hereof.

In FIG. 3C, the mold carrier member 202 is in the same position as that described above with reference to FIG. 3B. In the aspect depicted in FIG. 3C, the mold front end engagement mechanism 204 has horizontally shifted towards the mold assembly 300. In the aspect depicted in FIG. 3C, the mold front end engagement mechanism 204 has horizontally shifted towards the mold assembly 300. In aspects, one or more actuators, e.g., the actuators 205a and 205b can be utilized to horizontally shift the mold front end engagement mechanism 204 towards and away from the mold assembly 300. The actuators 205a and 205b can be any type of actuators suitable for use in the systems disclosed herein. In one aspect, the actuators 205a and 205b can be pneumatic actuators.

As can be seen in FIG. 3C, the horizontally shifting of the mold front end engagement mechanism 204 can facilitate contact and/or engagement with the top mold portion 306. For instance, the engagement structure 204b can exhibit a shape that can engage with a complementary recess 304g in the front end 304f of the middle mold portion 304 and/or with the bottom side 306e of the top mold portion 306. While not depicted in FIG. 3C, the mold front end engagement mechanism 204 can also engage the top mold portion 306 and/or middle mold portion 304 using the engagement structure 204a shown in FIG. 3A so that both ends of the top mold front end can be removably secured to the mold front end engagement mechanism 204.

In the aspect depicted in FIG. 3C, the mold lock 308 remains in the locked configuration and the mold lock engagement mechanism 216 is not engaged with the mold lock 308. FIG. 3E depicts a front view of the mold lock engagement mechanism 216 and mold lock 308 in the positions depicted in FIG. 3C. As can be seen in the aspect depicted in FIG. 3E, the mold lock 308 can include a plate 309. While not specifically depicted in FIG. 3E, the plate 309 may be secured to the base mold portion 302 and/or the middle mold portion 304. In aspects, the plate 309 can include a securing member 311 positioned thereon. In aspects, the securing member 311 and the plate 309 can be an integral element or can be separate elements fixedly coupled together. In the aspect depicted in FIG. 3E, the mold lock 308 can include two links 308c and 308d, that pivot about a pivot point 310. While not depicted in FIG. 3E, the pivot point 310 and links 308c and 308d are coupled to a front end 306f of the top mold portion 306. With the mold lock 308 in the locked configuration, such as that depicted in FIG. 3E, at least a portion of the links 308c and 308d interact with at least a portion of the securing member 311 such that the top mold portion 306 cannot shift vertically upward and/or decouple the molds of the mold assembly.

FIG. 3E also depicts the mold lock engagement mechanism 216 coupled to the mold front end engagement mechanism 204. As can be seen in the aspect depicted in FIG. 3E, the mold lock engagement mechanism 216 can include a mold lock engagement member 216b coupled to an actuator 216a. In the aspect depicted in FIG. 3E, the mold lock engagement member 216b is in a retracted position and is not engaging with the mold lock 308, e.g., not engaging with one or more of the lock barrels 308a and 308b that are coupled to the links 308c and 308d, respectively, that may be rotatable.

Figure 3D:
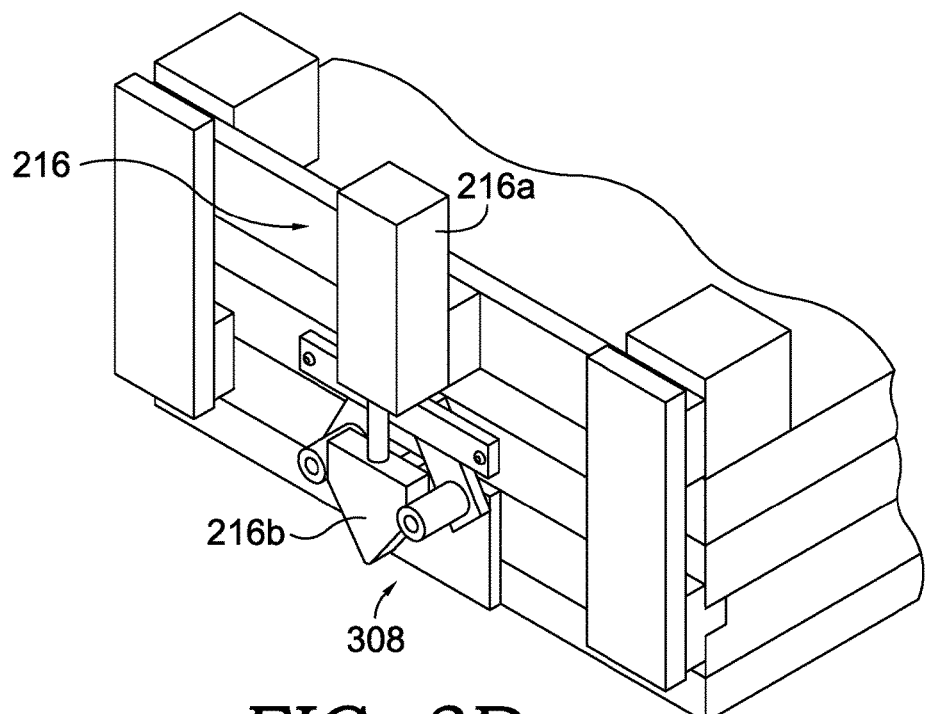
FIG. 3D depicts a front and side perspective view of a portion of a mold carrier member and a mold front end engagement mechanism coupled thereto, where a mold lock engagement mechanism has vertically shifted downward and the mold lock is in an unlocked configuration, in accordance with aspects hereof.

In the aspect depicted in FIGS. 3D and 3F, the mold lock engagement member 216b of the mold lock engagement mechanism 216 is in the extended position, e.g., via actuation by the actuator 216a, and is engaging with at least a portion of the mold lock 308, and the mold lock 308 is in an unlocked configuration. As best seen in the aspect of FIG. 3F, the downward extension of the mold lock engagement member 216b can shift the mold lock 308 to an unlocked configuration. For instance, the downward extension of the mold lock engagement member 216b results in interaction with the lock barrels 308a and 308b, which can cause the links 308c and 308d to pivot and/or rotate outward about the pivot point 310, thereby releasing the links 308c and 308d from interaction with the securing member 311 of the plate 309. In such an aspect in the unlocked configuration, the top mold portion 306 and/or middle mold portion 304 is capable of vertically shifting away from the base mold portion 302.

In various aspects, the actuator 216a can be any type of actuator suitable for use in the systems and methods disclosed herein. In one non-limiting example, the actuator 216a can be a pneumatic actuator. In certain aspects, the actuator 216a and/or the mold lock engagement mechanism 216 can be communicatively coupled to the control unit for coordination of the unlocking and locking of the mold lock 308 with the other functions and/or movements of the mold opening apparatus 200.

As discussed above, with reference to FIGS. 3D and 3F, the mold front end engagement mechanism 204 has engaged the top mold portion 306, and the top mold portion 306 is removably secured to the mold carrier member 202. Further, as discussed above with reference to FIGS. 3D and 3F, the mold lock engagement mechanism 216 has engaged the mold lock 308 shifting the mold lock 308 into an unlocked configuration. In such aspects, the mold opening apparatus 200 is able to vertically lift the top mold portion 306 up and away from the middle mold portion 304 and/or base mold portion 302. In one aspect, as discussed above, the vertical movement mechanism, depicted in FIGS. 2E-2G can be utilized to vertically lift the mold carrier member 202 and the top mold portion 306.

Figure 4A:
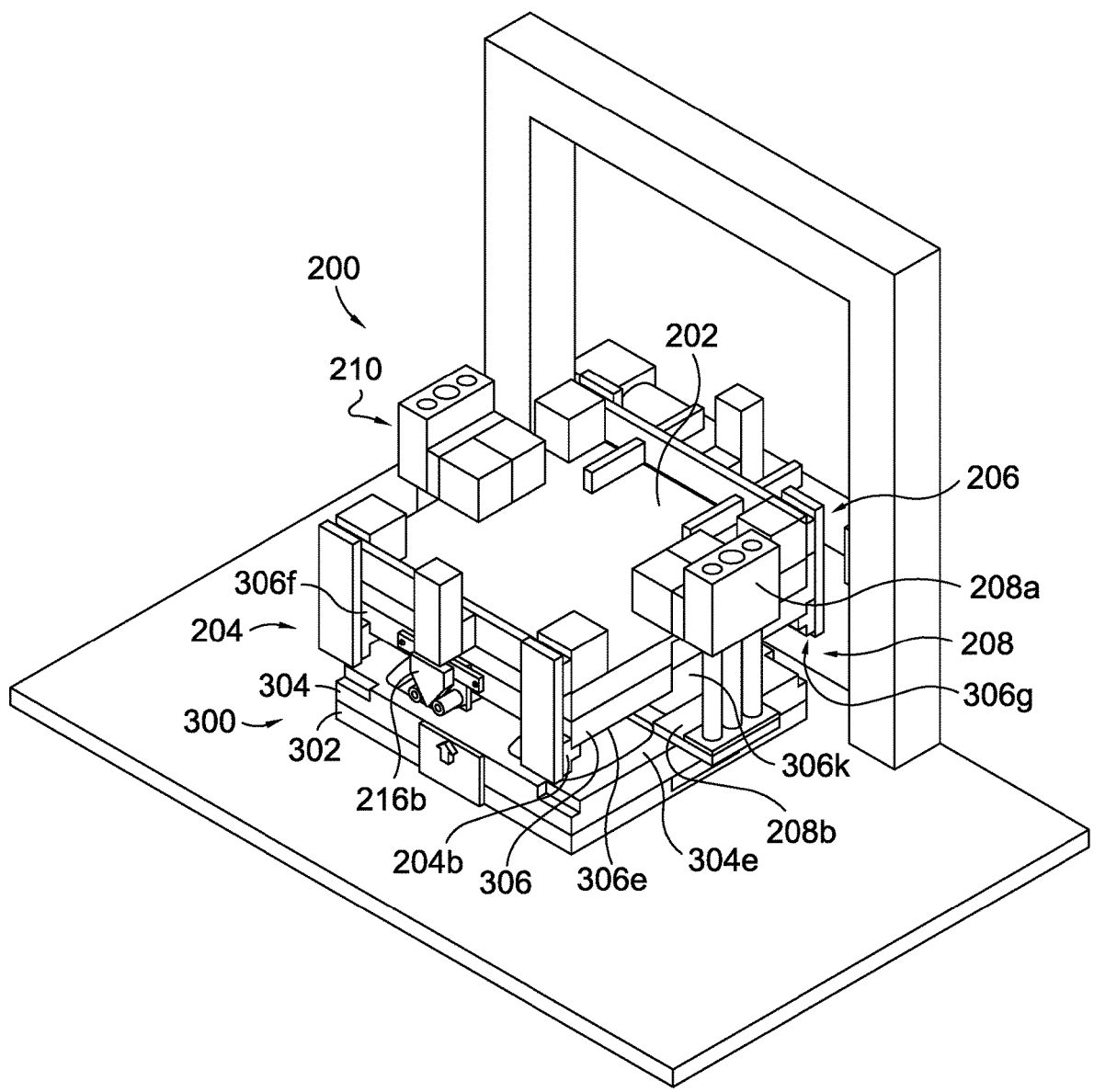
FIG. 4A is a front and side perspective view of a portion of a mold system, particularly showing the mold carrier member and top mold vertically shifted upward away from the middle mold, with a mold front end engagement mechanism and mold back end engagement mechanism removably secured to the top mold, and one or more side engagement mechanisms vertically extended down and contacting the middle mold; in accordance with aspects hereof.

FIG. 4A depicts the mold opening apparatus 200 and mold assembly 300 after the mold opening apparatus 200 has begun vertically lifting the mold carrier member 202 and the top mold portion 306 away from the middle mold portion 304 and/or the base mold portion 302. As discussed above, in aspects, when moving the top mold portion 306, one or more engagement mechanisms, can be removably secured to the top mold portion 306. For instance, as can be seen in the aspect depicted in FIG. 4A, the engagement structure 204b of the mold front end engagement mechanism 204 is removably secured to bottom side 306e of the top mold portion 306. While not specifically described in the figures, the mold front end engagement mechanism 204 can also removable secure to the opposite corner, or adjacent region, on the front end 306f of the top mold portion 306, while the mold back end engagement mechanism 206 may removably secure to the two corners or adjacent region of the back end 306g of the top mold portion 306.

In one or more aspects, one or more mold side engagement mechanisms 208 and/or 210 may facilitate the upward movement of the mold carrier member 202 and/or the top mold portion 306. For instance, as can be seen in the aspect depicted in FIG. 4A, the engagement member 208b of the mold side engagement mechanism 208 has vertically shifted down away from the top mold portion 306 and the mold carrier member 202. In such an aspect, the engagement member 208b can vertically shift downward from the position adjacent a bottom surface of the mold carrier member 202 past a recess 306k in the top mold portion 306 and can contact the upper side 304e of the middle mold portion 304. In aspects, the engagement member 208b can vertically shift via an actuator 208a. In aspects, the actuator 208a can be any type of actuator suitable for use in the systems and methods disclosed herein. Further, in various aspects, as the mold carrier member 202 and the top mold portion 306 vertically shift upward, e.g., via the vertical movement mechanism discussed above, the actuator 208a and engagement member 208b can apply a downward force on the upper side 304e of the middle mold portion 304 to aid in lifting the top mold portion 306 and mold carrier member 202. In the same or alternative aspects, the mold side engagement mechanism 210 can function similarly as described with reference to FIG. 4A on the opposite side of the top mold portion 306.

In various aspects, as the mold carrier member 202 and top mold portion 306 vertically shift upwards as described with reference to FIG. 4A, the mold lock engagement member 216b can shift to the retracted position, since the top mold portion 306 and associated mold lock components secured thereto have shifted away from the remainder of the mold lock components that are coupled to the base mold portion 302, as described above.

Figure 4B:
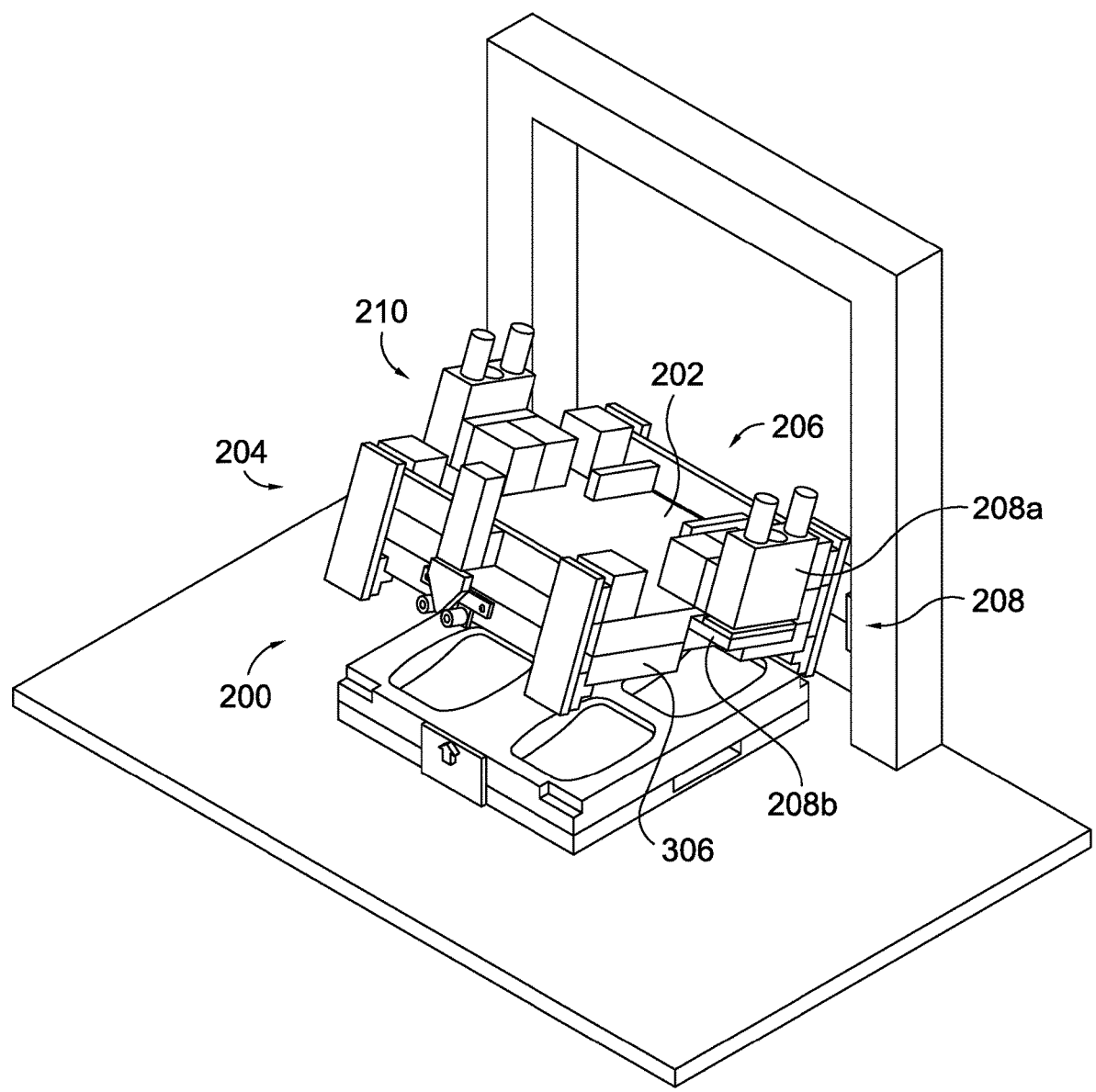
FIG. 4B is a front and side perspective view of a portion of the mold system of FIG. 4A, particularly showing the mold carrier member and top mold rotating about an axis away from the middle mold, with the one or more side engagement mechanisms vertically retracted, in accordance with aspects hereof.

FIG. 4B depicts the mold opening apparatus 200 as the top mold portion 306 and mold carrier member 202 are rotating about an axis, e.g., the axis 212a of FIG. 2A, after the top mold portion 306 and mold carrier member 202 have vertically shifted as described above with respect to FIG. 4A. In the aspect depicted in FIG. 4B, the engagement member 208b of the mold side engagement mechanism 208 has retracted vertically, via the actuator 208a, back towards the mold carrier member 202 from the prior position depicted in FIG. 4A. While not fully depicted in FIG. 4B, the mold side engagement mechanism 210 can also be in a similar retracted position. As can be seen in the aspect depicted in FIG. 4B, the mold front end engagement mechanism 204 and the mold back end engagement mechanism 206 are removably secured to the top mold portion 306 as the top mold portion 306 and mold carrier member 202 rotate.

Figure 4C:
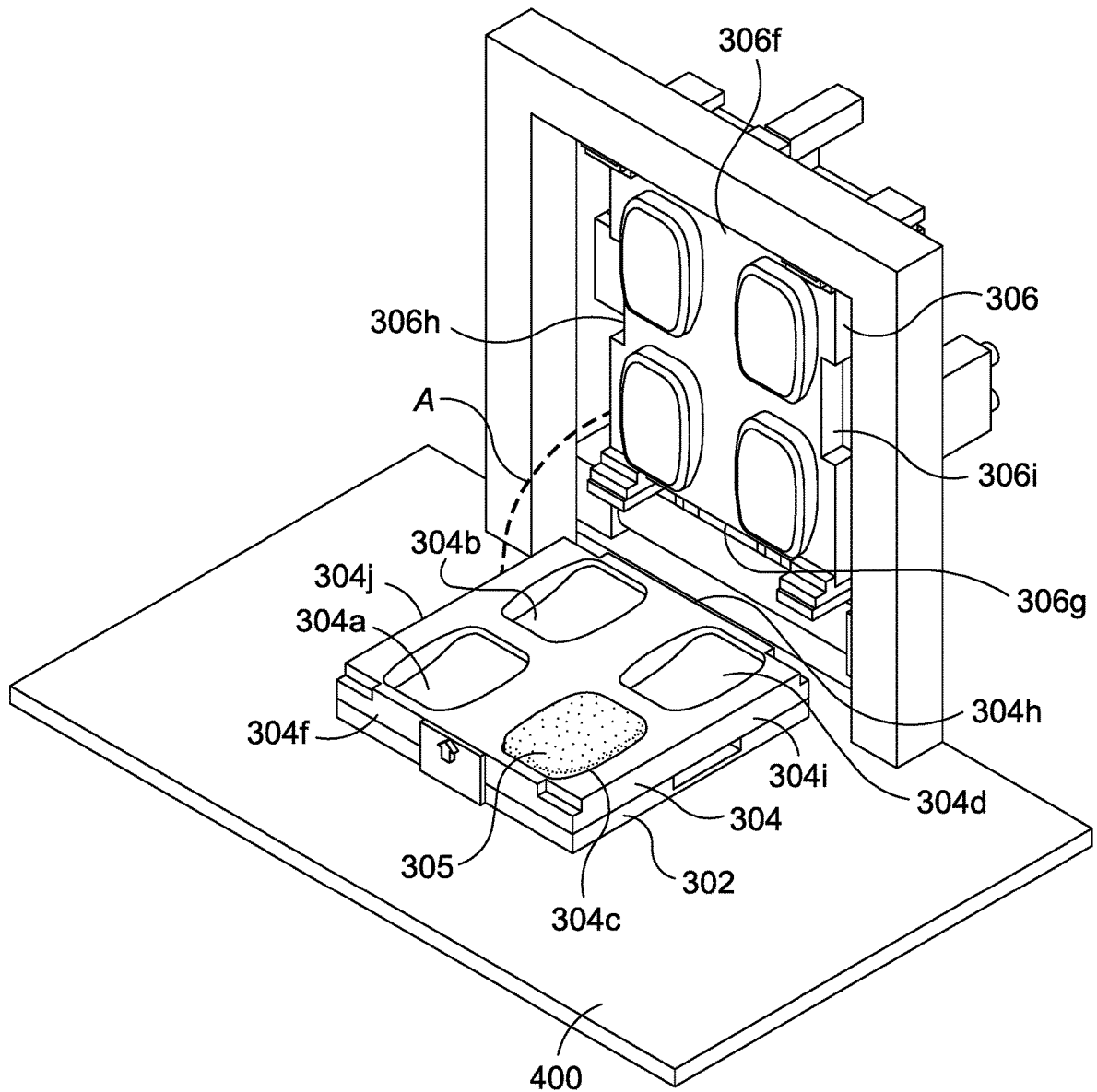
FIG. 4C is a front and side perspective view of a portion of the mold system of FIG. 4B, particularly showing the mold carrier member and top mold in a top mold and middle mold open configuration, where the top mold and mold carrier member are in a vertical position with respect to the middle mold and base mold, and showing a molding material in a mold surface of the middle mold, in accordance with aspects hereof.

FIG. 4C depicts the top mold portion 306 and mold carrier member 202 in a vertical position relative to the base mold portion 302 and middle mold portion 304. In certain aspects, a plane, extending between the sides 306i and 306h and between the front end 306f and the back end 306g of the top mold portion 306, is positioned at an angle A with respect to a plane, extending between the sides 304i and 304j and between the front end 304f and the back end 304h, of the middle mold portion 304. In aspects, the angle A can be 70° or more, 80° or more, 90° or more, 100° or more, 110° or more, or about 90°. In the aspect depicted in FIG. 4C, the vertical orientation of the top mold portion 306 with respect to the middle mold 340 and/or the base mold portion 302 can be referred to as an open mold configuration and/or can be referred to as a top mold and middle mold open configuration. As can be seen in the aspect depicted in FIG. 4C, when the top mold portion 306 is vertically oriented it is horizontally spaced apart from the base mold portion 302 and the middle mold portion 304. As can be seen in the aspect depicted in FIG. 4C, a mold material 305 has been added to the mold surface 304c.

In aspects, when the mold assembly is in the top mold and middle mold open configuration, such as that depicted in FIG. 4C, one or more mold materials can be received in the individual mold surfaces 304a, 304b, 304c, and 304d of the middle mold portion 304. As discussed above, in certain aspects, the mold system, mold opening apparatus, and methods disclosed herein can be utilized to form at least a portion of an article of footwear. In one example aspect, at least a portion of a footwear sole, e.g., a midsole, inner sole, outsole, or combination thereof, can be formed in the present systems and methods. In certain aspects, the mold material can include polymer-based materials, such as for example, polyurethane ("PU"), thermoplastic polyurethane ("TPU"), silicone, ethylene-vinyl acetate ("EVA"), polypropylene ("PP"), rubber, and other materials suitable for use as a midsole, inner sole, outsole, or combination thereof. In one aspect, the polymer-based materials, e.g., PU, TPU, EVA, PP, and/or rubber, can be a foamed material.

Figure 4D:
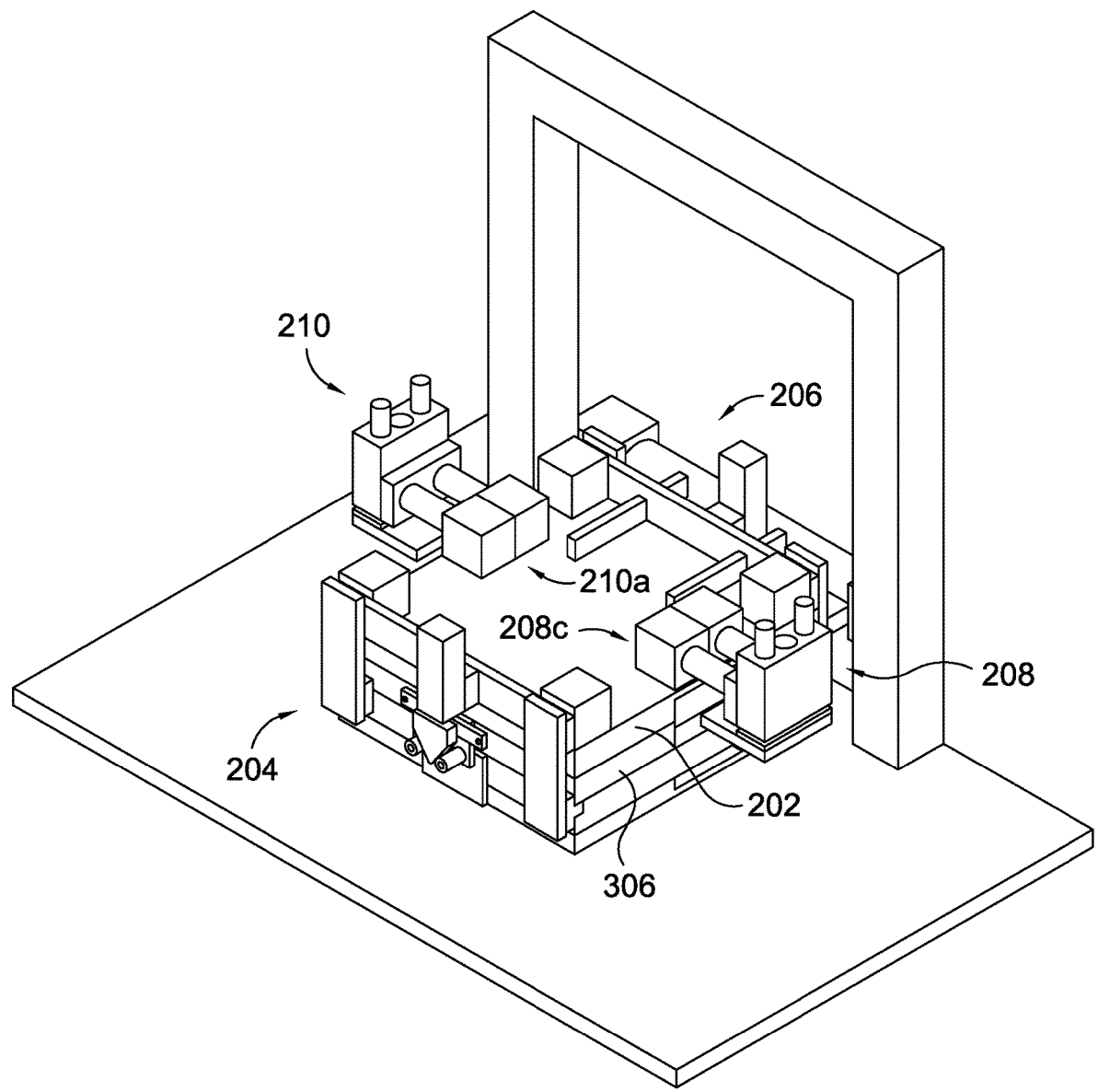
FIG. 4D is a front and side perspective view of a portion of the mold system of FIG. 4C, particularly showing the mold carrier member and top mold positioned on top of the middle mold, with the one or more mold side engagement mechanisms horizontally shifted away from the mold assembly, in accordance with aspects hereof.

In the aspect depicted in FIG. 4D, the mold carrier member 202 and the top mold portion 306 have rotated to a position above the middle mold portion 304, from the vertically oriented positioned depicted in FIG. 4C, and then vertically shifted down so that the top mold portion 306 is positioned on top of the middle mold portion 304. Similar to when the mold carrier member 202 and the top mold portion 306 are rotated up away from the middle mold portion 304, the mold front end engagement mechanism 204 and the mold back end engagement mechanism 206 remain removably secured to the top mold portion 306, as the mold carrier member 202 and the top mold portion 306 rotate back down towards the middle mold portion 304, as depicted in FIG. 4D. In aspects, once the top mold portion 306 is positioned on top of the middle mold portion 304, the mold side engagement mechanisms 208 and 210 can horizontally shift out and away from the top mold portion 306. In certain aspects, the mold side engagement mechanisms 208 and 210 can include actuators 208c and 210a, respectively, that can facilitate the horizontal movement of the mold side engagement mechanisms 208 and 210. In aspects, the actuators 208c and 210a can be any type of actuator that is suitable for use in the systems and methods disclosed herein. In one aspect, the actuators 208c and 210a can be pneumatic actuators.

Figure 4E:
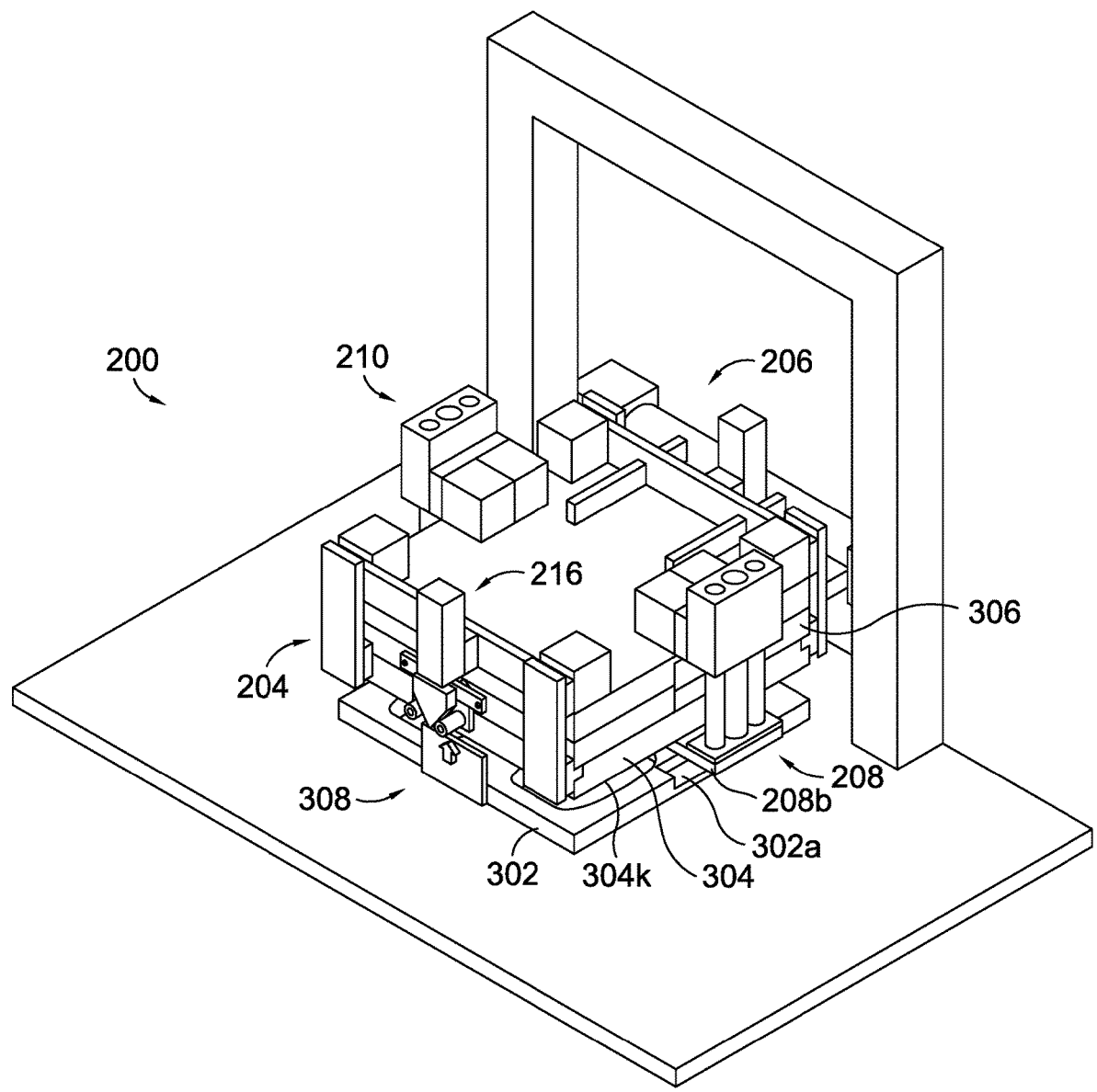
FIG. 4E is a front and side perspective view of a portion of the mold system of FIG. 4D, particularly showing the mold carrier member and top mold positioned on top of the middle mold, with one or more mold side engagement mechanisms removably secured to a bottom side of the middle mold, in accordance with aspects hereof.

In FIG. 4E, the mold opening apparatus 200 has engaged the middle mold portion 304 and has vertically shifted up away from the base mold portion 302. As discussed above with respect to the mold lock 308, the mold lock engagement mechanism 216 has unlocked the mold lock 308 from the locked configuration depicted in FIG. 4D, to allow the middle mold portion 304 and top mold portion 306 to vertically shift up and away from the base mold portion 302.

In certain aspects, in order to engage the middle mold portion 304, the mold side engagement mechanisms 208 and 210 have shifted downward from their respective position depicted in FIG. 4D and then horizontally towards the middle mold portion 304 to removably secure to the middle mold portion 304. In such an aspect, for instance with respect to the engagement member 208b, the base mold portion 302 can include a recess 302a so that the engagement member 208b can horizontally shift inward and engage the middle mold portion 304.

As can be seen in FIG. 4E, the engagement member 208b is contacting a bottom surface 304k of the middle mold portion 304 to secure the middle mold portion 304 to the mold carrier member 202. In the aspect depicted in FIG. 4D, the mold front end engagement mechanism 204 and the mold back end engagement mechanism 206 removably secure the top mold portion 306, while the mold side engagement mechanisms 208 and 210 removably secure the middle mold portion 304. In such an aspect, the middle mold portion 304 and the top mold portion 306 can be vertically shifted upward, as depicted in FIG. 4D and then rotated to a middle mold and base mold open configuration, such as that depicted in FIG. 4F.

Figure 4F:
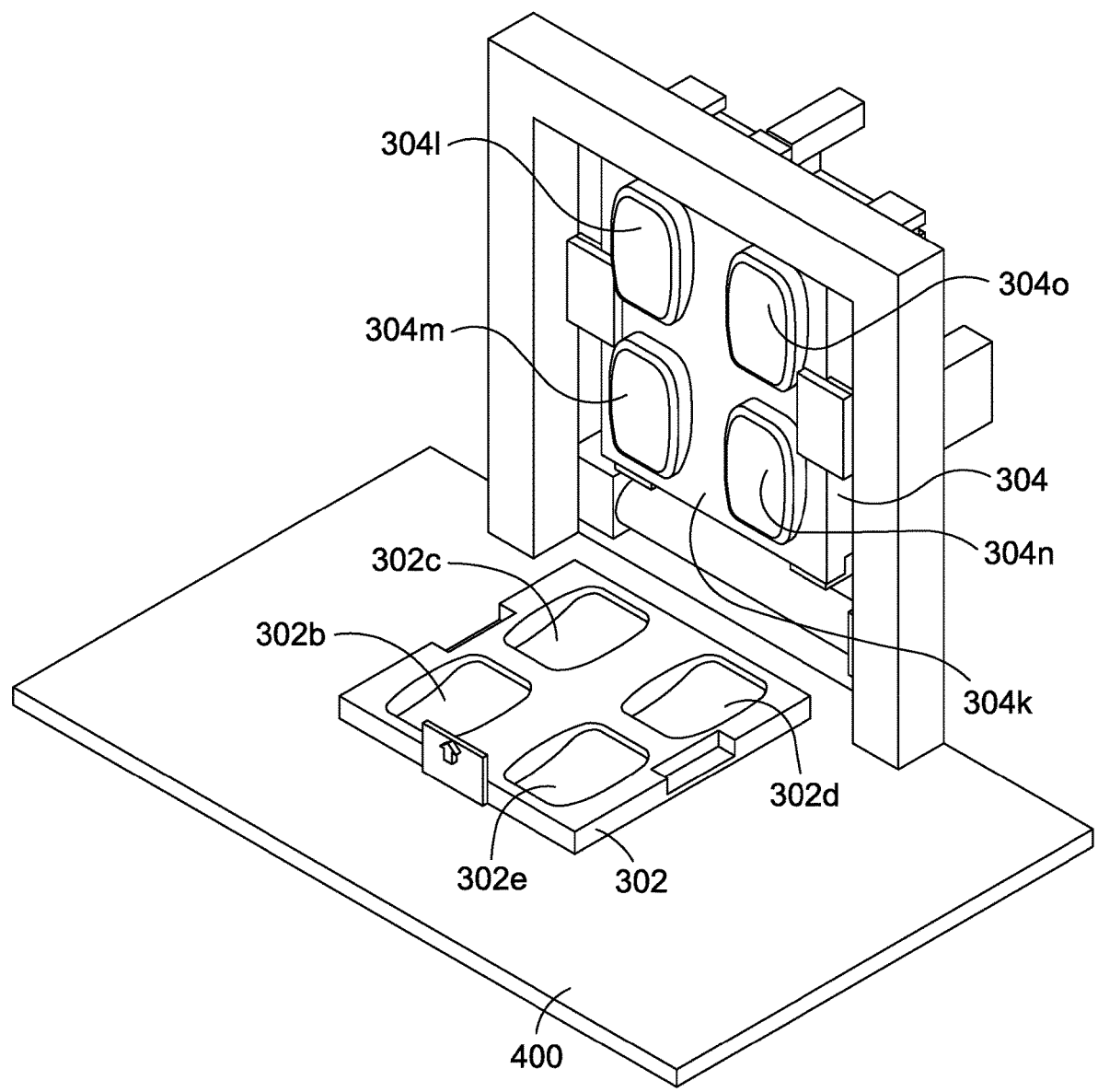
FIG. 4F is a front and side perspective view of a portion of the mold system of FIG. 4E, particularly showing the mold assembly in a middle mold and base mold open configuration, where the top mold, middle mold, and mold carrier member are in a vertical position with respect to the base mold, in accordance with aspects hereof.

As can be seen in FIG. 4F, the middle mold portion 304 and the top mold portion 306 are vertically oriented with respect to the base mold portion 302. In certain aspects, an angle between the middle mold portion 304 and the base mold portion 302 can include the same parameters as the angle A discussed above with respect to FIG. 4C, showing a top mold and middle mold open configuration. In the aspect depicted in FIG. 4F, a mold material can be inserted into the mold surfaces 302b, 302c, 302d, and 302e of the base mold portion 302. In aspects, the mold materials for the base mold portion 302 can be same as the mold materials discussed above with respect to FIG. 4C. As can be seen in the aspect depicted in FIG. 4F, the bottom surface 304k of the middle mold portion 304 can include mold surfaces 304l, 304m, 304n, and 304o that are convex, and can be complementary to the concave mold surfaces in the base mold portion 302.

Figure 5A:
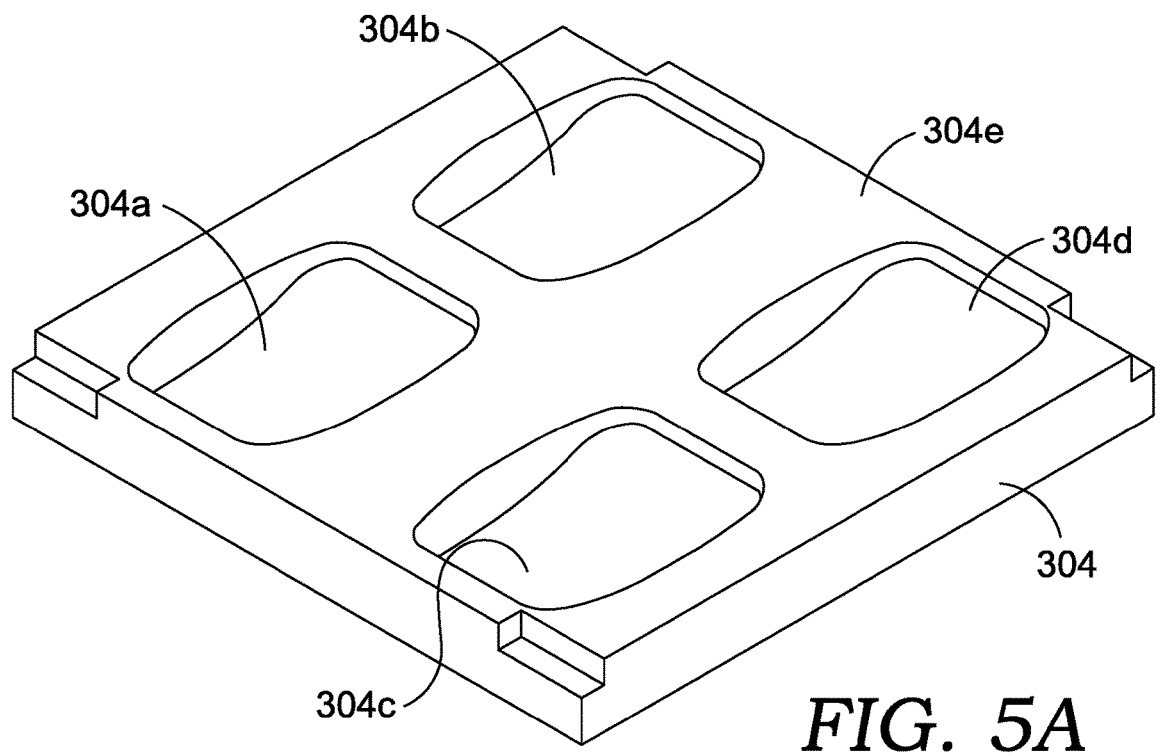
FIG. 5A is a front and side perspective view of an example middle mold, particularly showing concave mold surfaces on a top side, in accordance with aspects hereof.
Figure 5B:
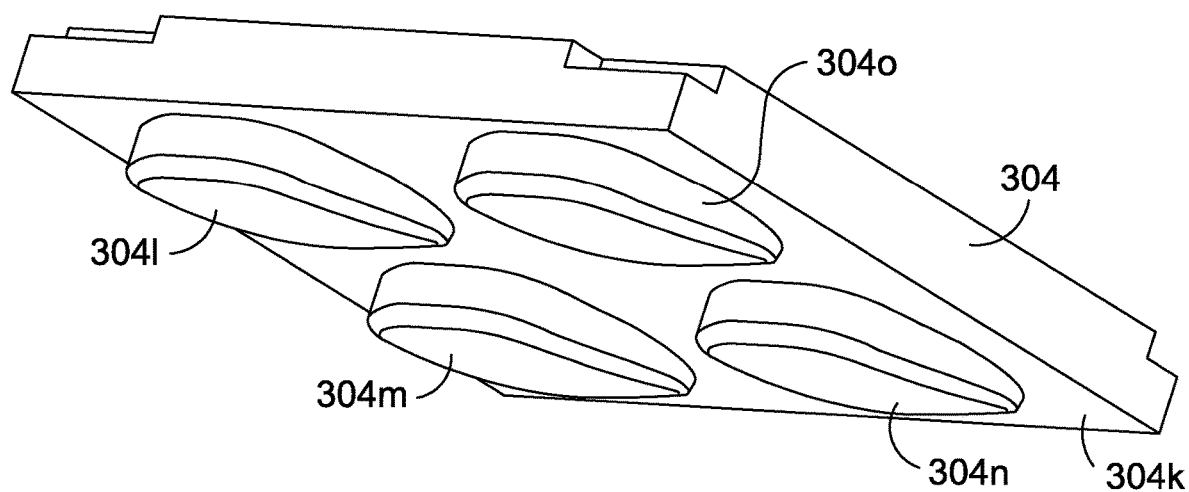
FIG. 5B is a front and side perspective view of the middle mold of FIG. 5A, particularly showing convex mold surfaces on a bottom side, in accordance with aspects hereof.

In certain aspects, it can be desirable to include a middle mold having mold surfaces on both opposing sides. For instance, in one aspect a dual-sided middle mold in the mold assembly can increase manufacturing volume, per unit mold assembly, and/or decrease process steps, e.g., as compared to using single-sided middle molds in a mold assembly. For example, FIGS. 5A and 5B depict a middle mold portion 304 having mold surfaces 304a, 304b, 304c, and 304d on an upper side 304e that are concave, and mold surfaces 304l, 304m, 304n, 304o on a bottom surface 304k that are convex. It should be understood that while four mold surfaces are depicted on each side, any number of mold surfaces are contemplated for use in the systems and methods disclosed herein.

Figure 6A:
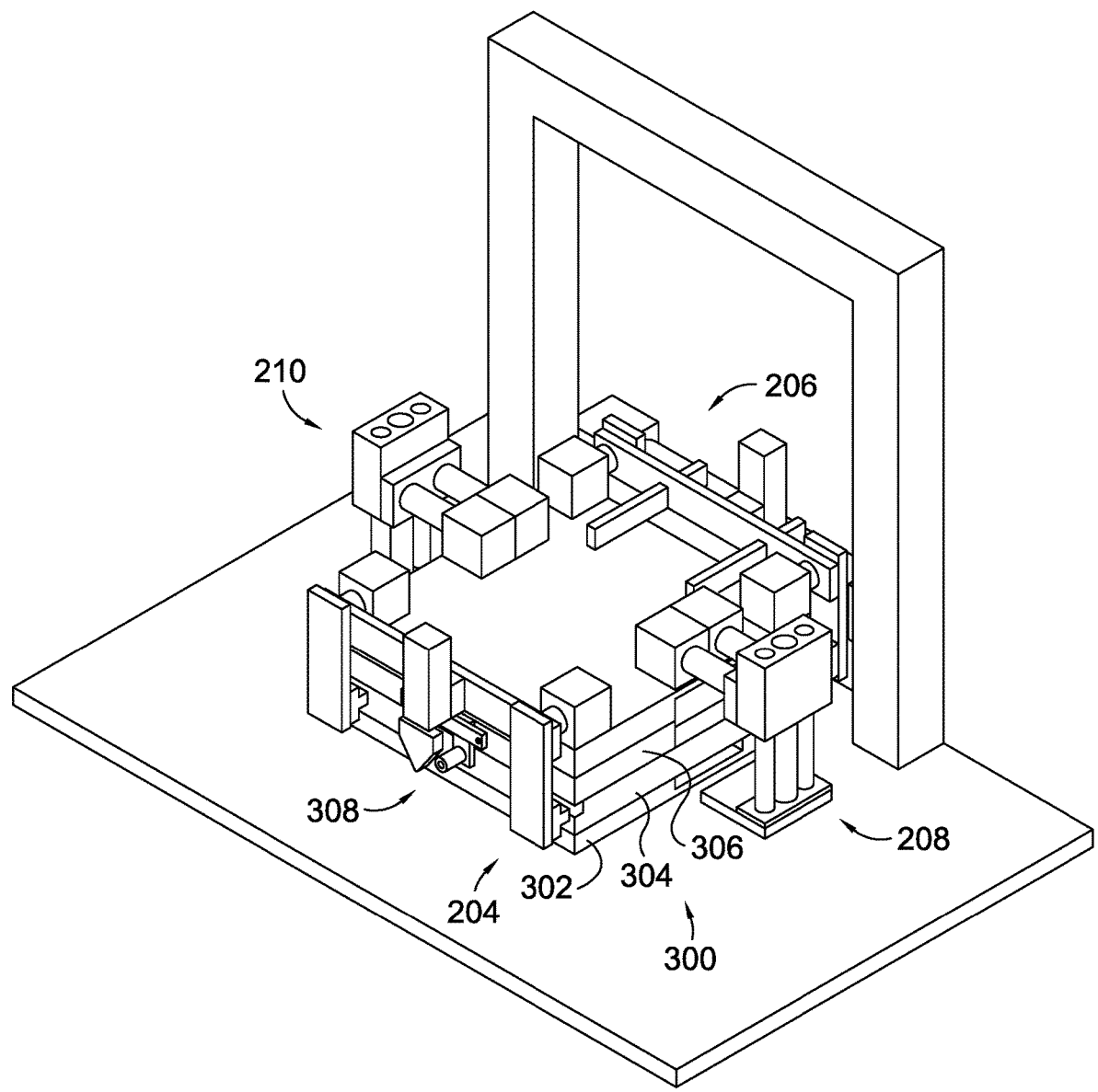
FIG. 6A is a front and side perspective view of a portion of the mold system of FIG. 4F, particularly showing the mold carrier member positioned on top of the top mold, middle mold, and base mold, with one or more mold side engagement mechanisms horizontally shifted away from the mold assembly and the mold front end engagement mechanism and mold back end engagement mechanism horizontally shifted away from the mold assembly, and the mold lock in a locked configuration, in accordance with aspects hereof.

In various aspects, the middle mold portion 304 and top mold portion 306 can rotate from the position depicted in FIG. 4F to a position above the base mold, as described previously, and then the middle mold portion 304 and top mold portion 306 can vertically shift downward so that the middle mold portion 304 is contacting the base mold portion 302. In the aspect depicted in FIG. 6A, the middle mold portion 304 and top mold portion 306 have returned to position on top of the base mold portion 302. In aspects, once the mold surfaces are filled with the desired mold materials and the top mold portion 306 and middle mold portion 304 have returned to the position depicted in FIG. 6A, the mold assembly 300 is ready for further processing. In the aspect depicted in FIG. 6A, the mold side engagement mechanisms 208 and 210 have horizontally shifted away and are no longer secured to the middle mold portion 304. Further as can be seen in FIG. 6A, the mold front end engagement mechanism 204 and the mold back end engagement mechanism 206 have horizontally shifted away and are no longer secured to the top mold portion 306. As also can be seen in the aspect depicted in FIG. 6A, the mold lock 308 is in the locked configuration.

Figure 6B:
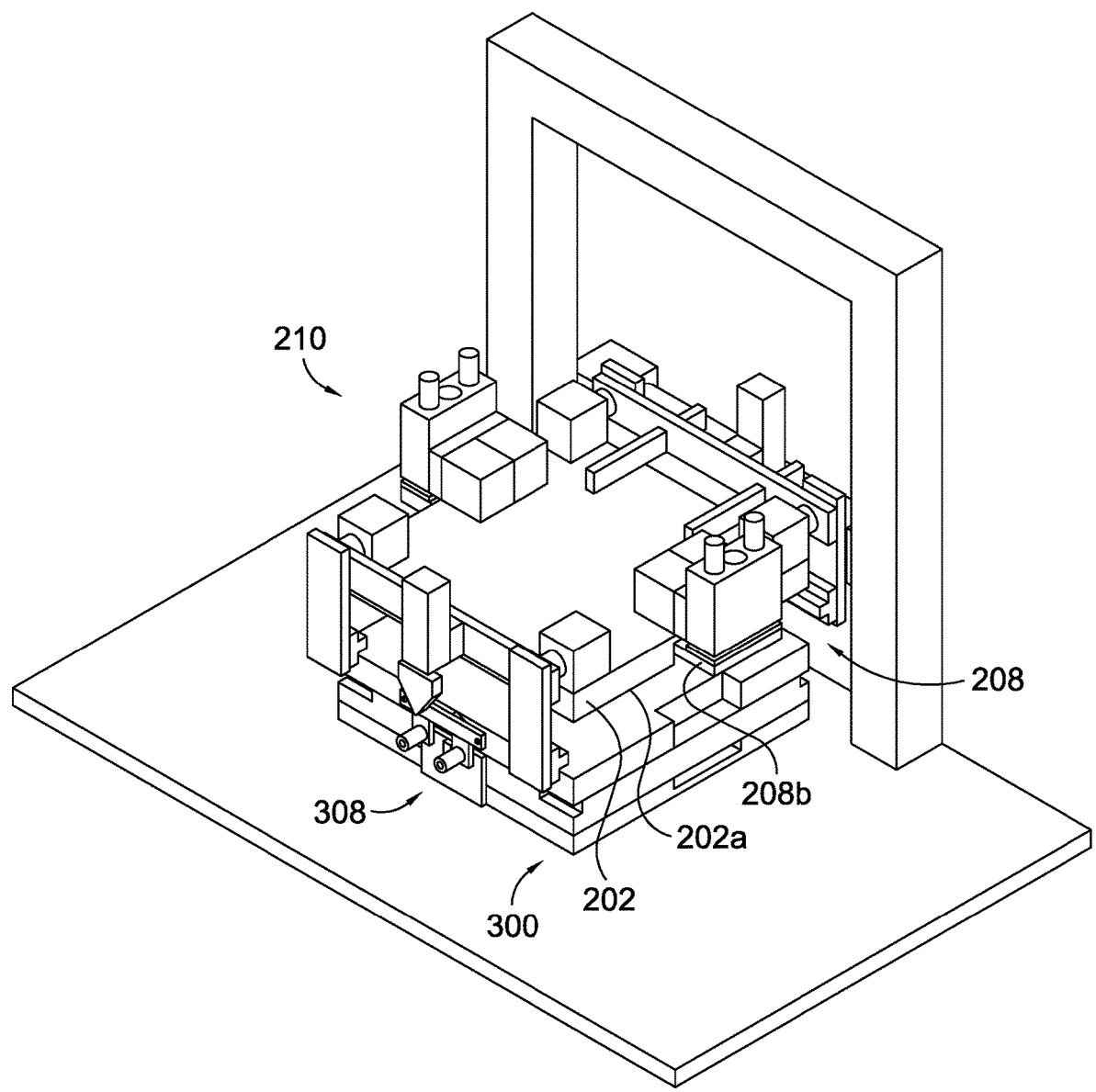
FIG. 6B is a front and side perspective view of a portion of the mold system of FIG. 6A, particularly showing the mold carrier member vertically shifted upward away from the mold assembly with the one or more mold side engagement mechanisms vertically retracted, in accordance with aspects hereof.

As can be seen in the aspect depicted in FIG. 6B, the mold carrier member 202 has vertically shifted from the position in FIG. 6A, up and away from the mold assembly 300. In certain aspects, the mold side engagement mechanisms 208 and 210 have vertically shifted up and then horizontally inward towards the mold carrier member 202, from the prior positioned depicted in FIG. 6A. In certain aspects, the engagement member 208b can contact a bottom surface 202a of the mold carrier member 202 to removably secure thereto for vertical and/or rotational movement of the mold carrier member 202 to return to the position depicted with respect to FIG. 2A. As discussed above, the mold assembly 300 is maintained in a locked configuration, via the mold lock 308, and is ready for further processing.

Figure 7:
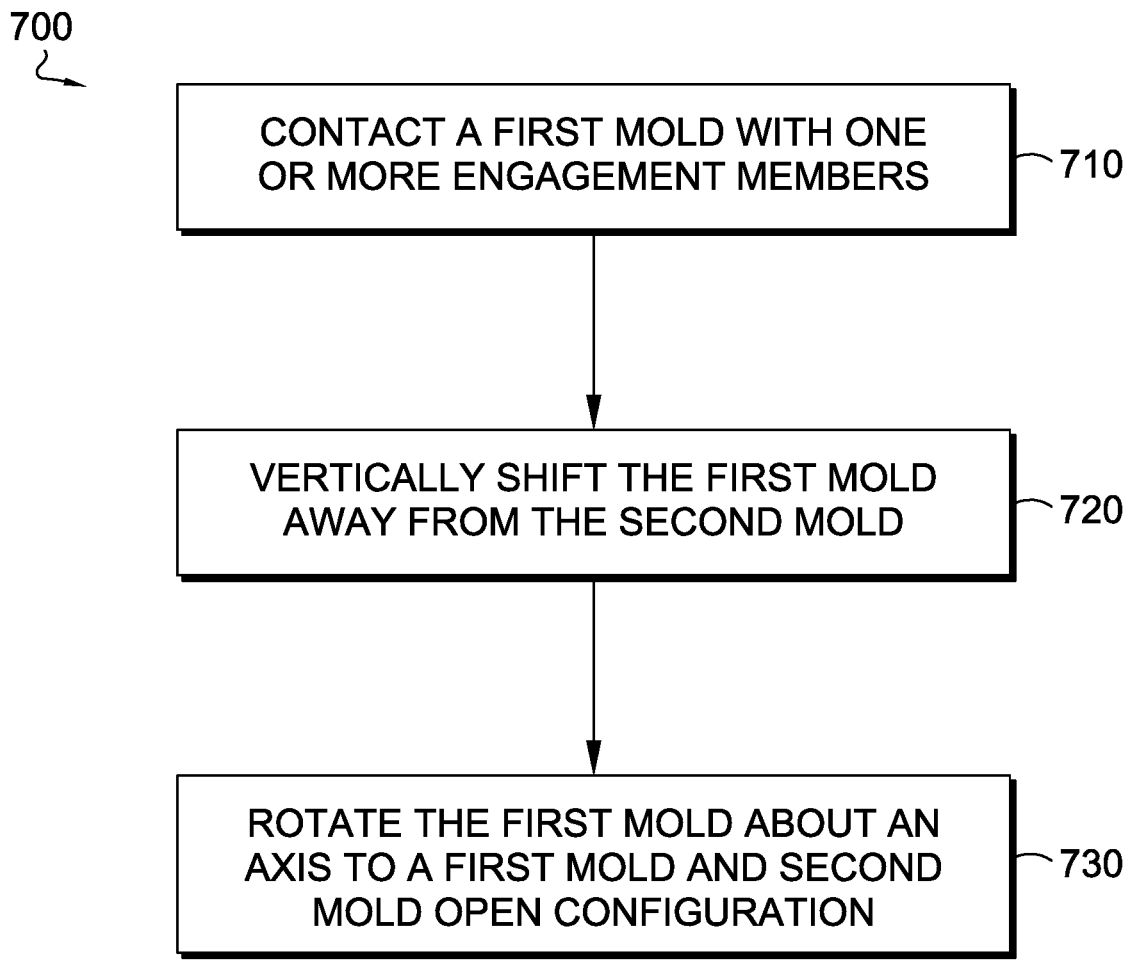
FIG. 7 depicts a flow diagram of an example method of opening and closing a mold assembly, in accordance with aspects hereof.

FIG. 7 is flow diagram of a method 700 for opening and closing a mold assembly. The method can include the step 710 of contacting a first mold with one or more engagement members. In certain aspects, the mold assembly can include any or all of the properties of the mold assembly 300 discussed above. In various aspects, at least a portion of the mold opening apparatus 200 discussed above can be utilized to perform the step 710. In certain aspects, the step 710 can be performed at least partly by one or more of the mold engagement mechanisms discussed above. For instance, in one aspect, the step 710 can include the utilizing the mold front end engagement mechanism 204 and/or the mold back end engagement mechanism 206 discussed herein.

The step 720 in the method 700 can include vertically shifting the first mold away from a second mold. In various aspects, at least a portion of the mold opening apparatus 200 discussed above can be utilized to perform the step 720. For example, in one aspect, the vertical movement mechanism 214 can be utilized to vertically shift the first mold away from the second mold. In the same or alternative aspect, one or more mold side engagement mechanisms can be utilized to facilitate vertically shifting the first mold away from the second mold, such as that described above with respect to FIG. 4A.

In the method 700, the step 730 can include rotating the first mold about an axis to a first mold and second mold open configuration. In various aspects, at least a portion of the mold opening apparatus 200 discussed above can be utilized to perform the step 730. In certain aspects, the step 730 can include the use of the rotational movement mechanism 213 discussed above. In various aspects, once the mold assembly is positioned in an open configuration one or more mold materials can be inserted into the mold surfaces therein. In certain aspects, the one or more mold materials can include one or more polymeric-based materials suitable for use as a midsole, inner sole, and/or outsole, as discussed above.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are illustrative in nature and are not limiting.

Clause 1: A mold opening apparatus, comprising: a mold carrier member, wherein the mold carrier member comprises: a first side, a second side opposite the first side; a front side, and a back side opposite the front side; a vertical movement mechanism coupled to the mold carrier member capable of linear vertical movement; a rotational movement mechanism coupled to the mold carrier member; and one or more mold engagement mechanisms, wherein the one or more mold engagement mechanisms are coupled to at least a portion of the mold carrier member.

Clause 2: The mold opening apparatus according to clause 1, wherein the rotational movement mechanism is coupled to the back side of mold carrier member, and wherein the rotational movement mechanism is adapted to rotate the mold carrier member about an axis, wherein the axis is substantially parallel to the direction of extension of the back side of the mold carrier member between the first side and the second side.

Clause 3: The mold opening apparatus according to clauses 1 or 2, wherein the one or more mold engagement mechanisms comprise first and second mold side engagement mechanisms and a mold front end engagement mechanism, wherein the first mold side engagement mechanism is coupled to the first side of the mold carrier member, and the second mold side engagement mechanism is coupled to the second side of the mold carrier member, and wherein the mold front end engagement member is coupled to the front side of the mold carrier member.

Clause 4: The mold opening apparatus according to clause 3, wherein the first and second mold side engagement mechanisms are adapted to horizontally shift towards and away from the respective first and second sides of the mold carrier member.

Clause 5: The mold opening apparatus according to clauses 3 or 4, wherein each of the first and second mold side engagement mechanisms is adapted to vertically shift towards and away from the mold carrier member.

Clause 6: The mold opening apparatus according to any of clauses 3-5, wherein the mold front end engagement mechanism is adapted to horizontally shift towards and away from the front end of the mold carrier member.

Clause 7: The mold opening apparatus according any of clauses 1-6, further comprising a rotational locking member, wherein the rotational locking member is adapted to inhibit rotational movement of the rotational movement mechanism during vertical movement of the mold carrier member by the vertical movement mechanism.

Clause 8: The mold opening apparatus according any of clauses 3-7, wherein the mold front end engagement mechanism comprises a mold lock engagement mechanism, and wherein the mold lock engagement mechanism is adapted to vertically shift to engage and disengage with a mold lock.

Clause 9: The mold opening apparatus according to any of clauses 1-8, further comprising a control unit, wherein the control unit is communicatively coupled to the vertical movement mechanism and the rotational movement mechanism and is adapted to control the vertical and rotational movement of the mold carrier member, and wherein the control unit is communicatively coupled to the one or more mold engagement mechanisms.

Clause 10: The mold opening apparatus according to any of clauses 1-9, wherein the one or more mold engagement mechanisms are coupled to at least one of the front side, the first side, or the second side of the mold carrier member Clause 11: A method for opening and closing a mold assembly, comprising: contacting a first mold portion of a mold assembly with one or more mold engagement mechanisms, wherein the mold assembly comprises at least the first mold portion and a second mold portion; vertically shifting the first mold portion away from the second mold portion, wherein the second mold portion is positioned between the first mold portion and a support structure; and subsequent to the vertically shifting the first mold portion away from the second mold portion, rotating the first mold portion about an axis to a first mold portion and second mold portion open configuration, wherein, in the first mold portion and second mold portion open configuration, a plane extending between a first side and second side of the first mold portion, and between a front end and back end of the first mold portion is at an angle of 70° or more relative to a plane extending between a first side and second side of the second mold portion, and between a front end and back end of the second mold portion.

Clause 12: The method according to clause 11, wherein the contacting the first mold portion of the mold assembly with one or more mold engagement mechanisms comprises horizontally shifting a mold front end engagement mechanism towards the front end of the first mold portion and the front end of the second mold portion so that at least a portion of the mold front end engagement mechanism is removably secured to the front end of the first mold portion.

Clause 13: The method according to clause 12, wherein the contacting the first mold portion of the mold assembly with one or more mold engagement mechanisms further comprises horizontally shifting a mold back end engagement mechanism towards the back end of the first mold portion and the back end of the second mold portion so that at least a portion of the mold back end engagement mechanism is removably secured to the back end of the first mold portion.

Clause 14: The method according to any of clauses 11-13, wherein the vertically shifting the first mold portion away from the second mold portion comprises contacting at least a portion of the second mold portion with one or more mold side engagement mechanisms to provide a downward force on the second mold portion towards the support structure and away from the first mold portion.

Clause 15: The method according to any of clauses 11-14, further comprising: subsequent to the rotating the first mold portion about an axis to the first mold portion and second mold portion open configuration, rotating the first mold portion about the axis so that the plane of the first mold portion is substantially parallel with the plane of the second mold portion, and the first mold portion is spaced apart from the second mold portion; and subsequent to the rotating the first mold portion about the axis so that the plane of the first mold portion is substantially parallel with the plane of the second mold portion, vertically shifting the first mold portion towards the second mold portion so that at least a portion of the first mold portion is in contact with at least a portion of the second mold portion.

Clause 16: The method according to any of clauses 11-15, wherein the mold assembly further comprises a third mold portion, and wherein the third mold portion is positioned between the second mold portion and the support structure.

Clause 17: The method according to clause 16, further comprising: contacting the second mold portion with one or more mold side engagement mechanisms; vertically shifting the first mold portion and the second mold portion away from the third mold portion; and subsequent to the vertically shifting the first mold portion and second mold portion away from the third mold portion, rotating the first mold portion and the second mold portion about the axis to a second mold portion and third mold portion open configuration, wherein in the second mold portion and third mold portion open configuration, the plane of the second mold portion is at an angle of 70° or more relative to a plane extending between a first and second side of the third mold portion, and between a front end and back end of the third mold portion.

Clause 18: The method according to clause 17, wherein the contacting the second mold portion with one or more mold side engagement mechanisms comprises: horizontally extending at least a portion of the one or more mold side engagement mechanisms out and away from the second mold portion; vertically shifting the at least a portion of the one or more mold side engagement mechanisms downward towards the third mold portion; and horizontally shifting the at least a portion of the one or more side mold engagement members towards the second mold portion to removably secure to the second mold portion.

Clause 19: The method according to any of clauses 11-18, wherein during at least a portion of the vertically shifting the first mold portion away from the second mold portion a mold lock of the mold assembly is in an unlocked configuration.

Clause 20: The method according to any of clauses 16-19, wherein the second mold portion comprises a first mold surface and a second mold surface opposite the first mold surface, wherein the first mold surface comprises one or more concave mold surfaces, and wherein the second mold surface comprises one or more convex mold surfaces.

Clause 21: The method according to clause 20, wherein the first mold portion comprises one or more convex mold surfaces, and wherein the third mold portion comprises one or more concave mold surfaces.

Clause 22: A mold system, comprising: a mold assembly, the mold assembly comprising a first mold portion and a second mold portion; and a mold opening apparatus, wherein the mold opening apparatus comprises: a mold carrier member, the mold carrier member comprising a first side, a second side opposite the first side; a front side, and a back side opposite the front side; a vertical movement mechanism coupled to the mold carrier member; a rotational movement mechanism coupled to the mold carrier member; and one or more mold engagement mechanisms, wherein the one or mold engagement mechanisms are coupled to at least a portion of the mold carrier member.

Clause 23: The mold system according to clause 22, further comprising a control unit, wherein the control unit is communicably coupled to the vertical movement mechanism and the rotational movement mechanism and is adapted to control the vertical and rotational movement of the mold carrier member.

Clause 24: The mold system according to clauses 22 or 23, wherein the one or more mold engagement mechanisms comprises first and second mold side engagement mechanisms and a mold front end engagement mechanism, wherein the first mold side engagement mechanism is coupled to the first side of the mold carrier member, wherein the second mold side engagement mechanism is coupled to the second side of the mold carrier member, and wherein the mold front end engagement mechanism is coupled to the front side of the mold carrier member.

Clause 25: The mold system according to clause 24, wherein the rotational movement mechanism is adapted to rotate the mold carrier member about an axis, wherein the axis is substantially parallel to the direction of extension of the back side of the mold carrier member between the first side and the second side, and wherein the first and second mold side engagement mechanisms are adapted to horizontally shift towards and away from the respective first and second sides of the mold carrier member.

Clause 26: The mold system according to any of clauses 22-25, further comprising a rotational locking member adapted to inhibit rotational movement of the rotational movement mechanism during vertical movement of the mold carrier member by the vertical movement mechanism.

Clause 27: The mold system according to clause 24, wherein the mold front end engagement mechanism is adapted to horizontally shift towards and away from the front end of the mold carrier member.

Clause 28: The mold system according to clause 24, wherein the mold front end engagement mechanism comprises a mold lock engagement mechanism, and wherein at least a portion of the mold lock engagement mechanism is adapted to vertically shift to engage and disengage with a mold lock associated with the mold assembly.

Clause 29: The mold system according to any of clauses 22-28, wherein the mold assembly further comprises a third mold portion, wherein the second mold portion is positioned between the first mold portion and the third mold portion, and wherein the third mold portion is positioned between the second mold portion and a support structure.

Clause 30: The mold system according to clause 29, wherein one or more mold assembly positioning members are coupled to the support structure, and wherein the one or more mold assembly positioning members contact at least a portion of the third mold portion.

Clause 31: The mold system according to clauses 29 or 30, wherein the second mold portion comprises a first mold surface and a second mold surface opposite the first mold surface, wherein the first mold surface comprises one or more concave mold surfaces, wherein the second mold surface comprises one or more convex mold surfaces, wherein the first mold portion comprises one or more convex mold surfaces, and wherein the third mold portion comprises one or more concave mold surfaces.

Clause 32: The mold system according to any of clauses 22-31, wherein the mold assembly comprises one or more mold surfaces for forming at least a portion of an article of footwear.

Clause 33: The mold system according to any of clauses 22-32, wherein the one or more mold engagement mechanisms are coupled to at least one of the front side, the first side, or the second side of the mold carrier member.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. A mold opening apparatus, comprising:
   a mold carrier member, wherein the mold carrier member comprises: a first side, a second side opposite the first side; a front side, and a back side opposite the front side;
   a vertical movement mechanism coupled to the mold carrier member;
   a rotational movement mechanism coupled to the back side of the mold carrier member and adapted to rotate the mold carrier about a fixed axis with a synchronized angular displacement, wherein the rotational movement mechanism comprises a rotational locking member for inhibiting rotational movement during vertical displacement; and
   two or more mold engagement mechanisms, wherein the two or more mold engagement mechanisms are coupled to at least a portion of the mold carrier member, wherein the mold engagement mechanisms comprise first and second side engagement arms and a front end engagement arm arranged at different angular positions on the mold carrier member, such that the mold parts engage and disengage mold parts in a sequential manner during rotational displacement.

2. The mold opening apparatus according of claim 1, wherein the two or more mold engagement mechanisms comprise first and second mold side engagement mechanisms and a mold front end engagement mechanism, wherein the first mold side engagement mechanism is coupled to the first side of the mold carrier member, and the second mold side engagement mechanism is coupled to the second side of the mold carrier member, and wherein the mold front end engagement member is coupled to the front side of the mold carrier member.

3. The mold opening apparatus of claim 2, wherein the first and second mold side engagement mechanisms are adapted to horizontally shift towards and away from the respective first and second sides of the mold carrier member.

4. The mold opening apparatus of claim 2, wherein each of the first and second mold side engagement mechanisms is adapted to vertically shift towards and away from the mold carrier member.

5. The mold opening apparatus of claim 2, wherein the mold front end engagement mechanism is adapted to horizontally shift towards and away from the front end of the mold carrier member.

6. The mold opening apparatus of claim 1, wherein the rotational locking member is adapted to inhibit rotational movement of the rotational movement mechanism during vertical movement of the mold carrier member by the vertical movement mechanism.

7. The mold opening apparatus of claim 2, wherein the mold front end engagement mechanism comprises a mold lock engagement mechanism, and wherein the mold lock engagement mechanism is adapted to vertically shift to engage and disengage with a mold lock.

8. The mold opening apparatus of claim 1, further comprising a control unit, wherein the control unit is communicatively coupled to the vertical movement mechanism and the rotational movement mechanism and is adapted to control the vertical and rotational movement of the mold carrier member, and wherein the control unit is communicatively coupled to the two or more mold engagement mechanisms.

9. The mold opening apparatus of claim 1, wherein the two or more mold engagement mechanisms are coupled to at least one of the front side, the first side, or the second side of the mold carrier member.

10. A mold opening apparatus, comprising:
a mold carrier member, wherein the mold carrier member comprises: a first side, a second side opposite the first side; a front side, and a back side opposite the front side;
a vertical movement mechanism coupled to the mold carrier member;
a rotational movement mechanism coupled to the mold carrier member; and
two or more mold engagement mechanisms, wherein the two or more mold engagement mechanisms are coupled to at least a portion of the mold carrier member, wherein the two or more mold engagement mechanisms include one or more engagement arms that translate linearly in response to rotation of the mold carrier member and engage and disengage mold parts in a predetermined sequence.

11. The mold opening apparatus of claim 10, wherein the two or more mold engagement mechanisms comprise a first mold side engagement mechanism, a second mold side engagement mechanism, and a mold front end engagement mechanism, and wherein the first and second mold side engagement mechanisms are coupled to opposite sides of the mold carrier member and the mold front end engagement mechanism is coupled to a front side of the mold carrier member.

12. The mold opening apparatus of claim 10, wherein each of the mold engagement mechanisms includes an engagement arm adapted to translate linearly between an engaged position and disengaged position in response to rotation of the mold carrier member.

13. A mold opening apparatus, comprising:
a mold carrier member, wherein the mold carrier member comprises: a first side, a second side opposite the first side; a front side, and a back side opposite the front side;
a vertical movement mechanism coupled to the mold carrier member;
a rotational movement mechanism coupled to the back side of the mold carrier member and adapted to rotate the mold carrier about a fixed axis with a synchronized angular displacement, wherein the rotational movement mechanism comprises a rotational locking member for inhibiting rotational movement during vertical displacement; and
one or more mold engagement mechanisms, wherein the one or more mold engagement mechanisms are coupled to at least a portion of the mold carrier member,
wherein each mold engagement mechanism includes a shiftable arm having a distal end configured to engage a portion of a mold, and wherein the arm is mechanically linked to rotational displacement of the mold carrier member such that the engagement or disengagement occurs during rotation.

14. The mold opening apparatus of claim 13, wherein the rotational movement mechanism includes a gear linkage operatively connected to the one or more mold engagement mechanisms to synchronize rotational displacement with engagement or disengagement of mold parts.

15. The mold opening apparatus of claim 13, further comprising a control unit communicatively coupled to the vertical movement mechanism, the rotational movement mechanism, and the one or more mold engagement mechanisms, wherein the control unit is adapted to coordinate vertical and rotational displacement with engagement and disengagement of the mold parts.

* * * * *